(12) United States Patent
Kulkarni et al.

(10) Patent No.: US 8,145,560 B2
(45) Date of Patent: Mar. 27, 2012

(54) DETECTING FRAUDULENT ACTIVITY ON A NETWORK

(75) Inventors: Rajandra Laxman Kulkarni, Burlington, MA (US); Vijay C. Bhatt, Burlington, MA (US); Stephen Singh, Westford, MA (US); Dan Tonelli, Hopkinton, MA (US); Adam Greenberg, Lincoln, MA (US)

(73) Assignee: FMR LLC, Boston, MA (US)

( * ) Notice: Subject to any disclaimer, the term of this patent is extended or adjusted under 35 U.S.C. 154(b) by 1203 days.

(21) Appl. No.: 11/559,767

(22) Filed: Nov. 14, 2006

(65) Prior Publication Data

US 2008/0114885 A1 May 15, 2008

(51) Int. Cl.
*G06Q 40/00* (2012.01)

(52) U.S. Cl. .............. 705/38; 379/189; 379/114.14; 702/186; 705/35; 705/50; 705/52; 709/223; 709/238; 455/410; 713/189; 726/22; 726/23

(58) Field of Classification Search .............. None
See application file for complete search history.

(56) References Cited

U.S. PATENT DOCUMENTS

| | | | |
|---|---|---|---|
| 6,324,647 B1 | 11/2001 | Bowman-Amuah | 713/201 |
| 6,335,927 B1 | 1/2002 | Elliott et al. | |
| 6,377,672 B1* | 4/2002 | Busuioc | 379/189 |
| 6,519,571 B1 | 2/2003 | Guheen et al. | 705/14 |
| 6,801,606 B1* | 10/2004 | Edwards | 379/114.14 |
| 6,920,455 B1 | 7/2005 | Weschler | |
| 7,085,683 B2* | 8/2006 | Anderson et al. | 702/186 |
| 7,249,104 B2* | 7/2007 | Zuili | 705/52 |
| 7,594,266 B2* | 9/2009 | Mattsson et al. | 726/22 |
| 2002/0022474 A1* | 2/2002 | Blom et al. | 455/410 |
| 2002/0073232 A1* | 6/2002 | Hong et al. | 709/238 |
| 2002/0073337 A1* | 6/2002 | Ioele et al. | 713/201 |
| 2003/0097320 A1* | 5/2003 | Gordon | 705/35 |
| 2003/0097330 A1* | 5/2003 | Hillmer et al. | 705/38 |
| 2003/0100370 A1 | 5/2003 | Gatto et al. | 463/42 |
| 2003/0185361 A1* | 10/2003 | Edwards | 379/114.14 |
| 2003/0187841 A1 | 10/2003 | Zhang et al. | 707/4 |
| 2004/0015596 A1 | 1/2004 | Sapuram et al. | |
| 2004/0064428 A1 | 4/2004 | Larkin et al. | 707/1 |

(Continued)

FOREIGN PATENT DOCUMENTS

WO 02/45380 6/2002

(Continued)

OTHER PUBLICATIONS

Saddique, M. and Amir, Muhammad (2005) Literature review of mobile geo-location techniques. In: The AEESEAP International Conference 2005, Jun. 7-8, 2005, Kuala Lum-pur, Malaysia.*

(Continued)

*Primary Examiner* — Charles Kyle
*Assistant Examiner* — Robert Niquette
(74) *Attorney, Agent, or Firm* — Proskauer Rose LLP

(57) ABSTRACT

Described are computer-based methods and apparatuses, including computer program products, for detecting fraudulent activity on a network. A user utilizes a transmitting device to transmit user requests that are split between a plurality of data centers for processing. The user requests are captured at the data centers. The user requests are unified into a user session. The user session can be analyzed for fraud detection, marketing analysis, network intrusion detection, customer service analysis, and/or performance analysis. If fraudulent activity is detected, then the user can be interdicted to prevent further fraudulent activity.

19 Claims, 17 Drawing Sheets

U.S. PATENT DOCUMENTS

| | | | |
|---|---|---|---|
| 2004/0264481 A1 | 12/2004 | Darling et al. ............... 370/401 |
| 2004/0267920 A1 | 12/2004 | Hydrie et al. ................ 709/223 |
| 2004/0268357 A1 | 12/2004 | Joy et al. ....................... 718/105 |
| 2004/0268358 A1 | 12/2004 | Darling et al. ............... 718/105 |
| 2005/0033843 A1 | 2/2005 | Shahi et al. |
| 2005/0055435 A1 | 3/2005 | Gbadegesin et al. ......... 709/224 |
| 2005/0160280 A1* | 7/2005 | Caslin et al. ................. 713/189 |
| 2005/0165656 A1 | 7/2005 | Frederick et al. .............. 705/26 |
| 2005/0185779 A1* | 8/2005 | Toms ...................... 379/114.14 |
| 2005/0223109 A1 | 10/2005 | Mamou et al. ............... 709/232 |
| 2005/0246434 A1* | 11/2005 | Bantz et al. .................. 709/223 |
| 2005/0288954 A1 | 12/2005 | McCarthy et al. ............... 705/1 |
| 2006/0236395 A1 | 10/2006 | Barker et al. ................... 726/23 |
| 2007/0036309 A1* | 2/2007 | Zoldi et al. ............... 379/114.14 |
| 2007/0083928 A1* | 4/2007 | Mattsson et al. ................ 726/22 |
| 2007/0101425 A1* | 5/2007 | Mattsson ........................ 726/22 |
| 2007/0234409 A1 | 10/2007 | Eisen ............................... 726/6 |
| 2007/0239604 A1* | 10/2007 | O'Connell et al. ............. 705/50 |
| 2008/0114858 A1 | 5/2008 | Singh et al. |
| 2008/0114883 A1 | 5/2008 | Singh et al. |
| 2008/0114886 A1 | 5/2008 | Kulkarni et al. |
| 2008/0114888 A1 | 5/2008 | Bhatt et al. |
| 2008/0115213 A1 | 5/2008 | Bhatt et al. |

FOREIGN PATENT DOCUMENTS

| | | |
|---|---|---|
| WO | 02/096028 | 11/2002 |
| WO | WO 2007/032974 * | 3/2007 |

OTHER PUBLICATIONS

Stolfo, David et al. Credit Care Fraud Detection Using Meta-Learning: Issues and Initial Results. Department of Computer Science, Columbia University. © 1997.*

International Search Report dated Mar. 12, 2009, 6 pages.

Office Action of Oct. 22, 2008 received in U.S. Appl. No. 11/559,764.

U.S. Appl. No. 11/559,762, filed the same day as and shares specification with U.S. Appl. No. 11/559,767.

U.S. Appl. No. 11/559,764, filed the same day as and shares specification with U.S. Appl. No. 11/559,767.

"RSA® Adaptive Authentication, The Logical Consumer Solution," RSA Security, 2006, 4 pages.

"VeriSign® Identity Protection Fraud Detection Service," VeriSign® Data Sheet, Apr. 5, 2006, 5 pages.

"Fraud Detection," http://www.entrust.com/fraud-detection/index.htm, 2006, 2 pages.

"Enhanced Online Banking Security—Zero Touch Multi-Factor Authentication," http://www.entrust.com/resources/download.cfm/22600/efraudwhitepaper.pdf, undated, 4 pages.

M. Grandcolas, et al., "Implications of FFIEC Guidance and Proposed Solutions—Balancing Risk Mitigation and Customer Experience," Jun. 2006, 4 pages.

"Products—Product Overview," http://www.cydelity.com/products.html, 2006, 2 pages.

"Cydelity Introduces Comprehensive Protection for Online Banking with eSentry—The Last Line of Defense Against Online Fraud," http://news.thomasnet.com/printready.html?prid=488599, ThomasNet® ProductNewsRoom, Jun. 28, 2006, 4 pages.

"Seamless Integration, Progressive Implementation," Actimize Intelligence Server™, available from http://www.actimize.com, undated, 2 pages.

"Real-time Identity-based Monitor for Web Applications," Covelight Systems, http://www.covelight.com/percept.php, 2006, 2 pages.

"Stream Processing Technology Overview," AleriLabs, http://www.alerilabs.com/technology/overview.html, 2005, 3 pages.

"Risk Mitigation Management," Unisys, http://www.unisys.com/financial/solutions/banking/risk_mitigation.htm, 2006, 2 pages.

"Are You Sensing Every Intrusion Before it Becomes an Invasion?" Cymtec Systems, http://www.cymtec.com/pages/intrusion/intrusion-detection.html, 2005, 3 pages.

"Actimize Releases Industry's Most Comprehensive Online Fraud Solution for Financial Services; Multi-Factor Authentication and Fraud Detection Technology Combine to Deliver End-To-End Online Fraud Prevention," available at http://www.findarticles.com, Jan. 30, 2006, 2 pages.

Office Action of Oct. 28, 2008 received in U.S. Appl. No. 11/559,764, which shares the same filing date and specification as U.S. Appl. No. 11/559,767.

Office Action of Mar. 31, 2009 received in U.S. Appl. No. 11/559,784, which shares the same filing date and specification as U.S. Appl. No. 11/559,767.

Office Action of Aug. 7, 2009 received in U.S. Appl. No. 11/559,764, which shares the same filing date and specification as U.S. Appl. No. 11/559,767.

Office Action of Jun. 17, 2009 received in U.S. Appl. No. 11/559,775, which shares the same filing date and specification as U.S. Appl. No. 11/559,767.

Office Action of Dec. 17, 2009 received in U.S. Appl. No. 11/559,784, which shares the same filing date and specification as U.S. Appl. No. 11/559,767.

Office Action of Mar. 3, 2010 received in U.S. Appl. No. 11/559,762, which shares the same filing date and specification as U.S. Appl. No. 11/559,767.

Office Action of Mar. 16, 2010 received in U.S. Appl. No. 11/559,775, which shares the same filing date and specification as U.S. Appl. No. 11/559,767.

Office Action of Mar. 26, 2010 received in U.S. Appl. No. 11/559,764, which shares the same filing date and specification as U.S. Appl. No. 11/559,767.

Office Action of Jul. 21, 2010 received in U.S. Appl. No. 11/559,771, which shares the same filing date and specification as U.S. Appl. No. 11/559,767.

Office Action of Dec. 13, 2010, received in U.S. Appl. No. 11/559,784, which shares the same filing date and specification as U.S. Appl. No. 11/559,767.

Office Action of Mar. 28, 2011, received in U.S. Appl. No. 11/559,771, which shares the same filing date and specification as U.S. Appl. No. 11/559,767.

* cited by examiner

```
                  600d
        ┌─────────────────────────────────────────────────
        │ Source:      Client Computer (192.168.0.1:4430)
  610d ─┤ Destination: Fidelity.Com (10.10.10.1:80)
        │ Protocol:    TCP
        │ Data:        . . .
        │              Investment Category = High Yield Bond;
        │              . . .
        │              Fund Performance = 10 Year and Greater than or equal to
        │ 0%;
  612d ─┤              . . .
        │              Morningstar Rating = Overall 5 Stars
        │              . . .
        │              Submit = Find Now
        │              . . .
```

DETECTING FRAUDULENT ACTIVITY ON A NETWORK

CROSS REFERENCES TO RELATED APPLICATIONS

This application relates to four co-pending applications identified by entitled "Reconstructing Data on a Network," U.S. patent application Ser. No. 11/559,762, entitled "Unifying User Sessions on a Network," U.S. patent application Ser. No. 11/559,764; entitled "Detecting Fraudulent Activity on a Network Using Stored Information," U.S. patent application Ser. No. 11/559,771; entitled "Detecting and Interdicting Fraudulent Activity on a Network," U.S. patent application Ser. No. 11/559,775 and entitled "Subscribing to Data Feeds on a Network," U.S. patent application Ser. No. 11/559,784, all of which were filed on Nov. 14, 2006 and all of which are assigned to the same entity.

FIELD OF THE INVENTION

The present invention relates generally to computer-based methods and apparatuses, including computer program products, for detecting fraudulent activity on a network.

BACKGROUND

The increased use of networks to access and provide information has caused a dramatic increase in the amount of data transmitted over networks. To handle this increased amount of traffic, computer systems used to store, process, and transmit the information have been increasing in size and distributed among data centers. This distribution among data centers allows for increased speed which allows for decreased response time in the retrieval and processing of information.

However, the increased speed and diversified data centers create an issue with the data that is sent to a plurality of data centers. The issue is that the data sent to and from users is distributed among the data centers. When the data from only one data center is analyzed, then it is extremely challenging if not impossible to obtain a complete representation of an user's activity.

The ability to analyze an user's activity as a whole is important in a wide spectrum of industries that provide trusted services over a network. These industries have to be able to analyze user activity to provide feedback and improve performance of the systems. In addition, industries have to be able to effectively and efficiently identify fraudulent activity on their networks.

Fraudulent activity has been increasing along with the rise in network based activity, Industries have responded by utilizing fraud detection systems to attempt to stop the loss of money and prestige. However, it has been challenging if not impossible for these fraud detection systems to collect the data from all of the data centers in real time and without impacting the customer's experience. Since fraudulent activity is increasing, it is important for industries, such as the financial services industry, to have a fraud detection system that can collect data packets from a plurality of data centers and reconstruct the data for the detection of fraudulent activity and other uses.

SUMMARY OF THE INVENTION

One approach to collecting data on a network is the reconstruction of data packets, transmitted on a network, into the data. In one aspect, there is a method for the reconstruction of data which receives data packets that are transmitted from a plurality of data centers. The data packets are sent to the data centers from a same user location. The data packets are processed. The reconstruction engine reconstructs the data from the data packets into a format that conforms with a particular protocol.

In another aspect, there is a computer program product for the reconstruction of data. The computer program product is tangibly embodied in an information carrier. The computer program product includes instructions being operable to cause a data processing apparatus to receive data packets at a reconstruction engine from a plurality of data centers. The data packets are transmitted from a same user location to different data centers in the plurality of data centers. The data packets are processed. The data is reconstructed from the data packets to a format that conforms with a particular protocol.

In another aspect, there is a system for the reconstruction of data. The system includes a data collection system and a reconstruction engine. The data collection system collects data packets at a data center. The data packets are transmitted to the reconstruction engine. The reconstruction engine receives data packets on a network from a plurality of data collection systems. The reconstruction engine processes the data packets and reconstructs the data packets into data that conforms with a particular protocol.

In another aspect, there is another system for the reconstruction of data. The system includes a means for collecting data packets at a data center and a means for reconstructing data. The means for collecting data packets receives data packets from a data center and transmits the data packets to the means for reconstructing data. The means for reconstructing data reconstructs data from data packets that conform with a particular protocol.

In another approach, the user sessions on a network are unified. In another aspect, there is a method for unification of user sessions. The method includes a unification engine that receives user requests from a plurality of data centers. The user requests are transmitted from a user location to the data centers. The user requests are processed. The user requests are unified into user sessions by the unification engine.

In another aspect, there is a computer program product for unification of user sessions. The computer program product is tangibly embodied in an information carrier. The computer program product includes instructions being operable to cause a data processing apparatus to receive user requests at a unification engine. The user requests are received from a plurality of data centers. The user requests were split between the plurality of data centers for processing. The user requests are reconstructed into user sessions by the reconstruction engine into a format that conforms with a particular protocol.

In another aspect, there is a system for unification of user sessions. The system includes a data collection system and a unification engine. The data collection system collects user requests from a data center and transmits the user requests to the unification engine. The unification engine receives user requests from the data collection system and processes the user requests to reconstruct user sessions.

In another aspect, there is another system for unification of user sessions. The system includes a means for collecting user requests which collects user requests at a data center. The user requests are transmitted by the means for collecting user requests to a means for unifying user sessions. The means for unifying user sessions processes the user requests to unify the user requests into user sessions.

In another approach, the user sessions on a network are analyzed to detect fraudulent activity. In another aspect, there is a method for detecting fraudulent activity on a network.

The method includes receiving user requests from data centers. The user requests that are separated from each other for transmission to a plurality of data centers are combined to form a user session. The user session is processed to determine whether the user session is fraudulent using a profiling engine and/or a rule engine.

In another aspect, there is a computer program product for detecting fraudulent activity on a network. The computer program product is tangibly embodied in an information carrier. The computer program product includes instructions being operable to cause a data processing apparatus to receive user requests from data centers. The user requests are combined to form a user session. The user requests were separated for processing among the data centers. A determination is made as to whether the user session is fraudulent using the profiling engine and/or the rule engine.

In another aspect, there is a system for detecting fraudulent activity on a network. The system includes a unification engine and a fraud detection system. The unification engine receives user requests from data centers. The unification engine processes the user requests to reconstruct user sessions. The fraud detection system analyzes the user session to determine if it is fraudulent.

In another aspect, there is another system for detecting fraudulent activity on a network. The system includes a means for unifying user sessions and a means for fraud detection. The means for unifying user sessions receives user requests from data centers. The means for unifying user sessions processes the user requests to unify user sessions. The means for fraud detection analyzes the user session to determine if the user session is fraudulent.

In another approach, the user sessions on a network are analyzed to detect fraudulent activity using stored information. In another aspect, there is a method for detecting fraudulent activity on a network using stored information. The method includes receiving user requests from data centers. The user requests are processed at a data center. The elements associated with the user session are stored in a memory module. An analysis is performed on the user session using at least a portion of the elements stored in the memory module.

In another aspect, there is a computer program product for detecting fraudulent activity on a network using stored information. The computer program product is tangibly embodied in an information carrier. The computer program product includes instructions being operable to cause a data processing apparatus to receive user requests from data centers. The user requests are combined to form a user session. The user requests had been separated among data centers. The elements associated with the user session are stored in a memory module. An analysis is performed on the user session using at least a portion of the elements stored in the memory module to determine if the activity associated with the user session is fraudulent.

In another aspect, there is a system for detecting fraudulent activity on a network using stored information. The system includes a unification engine, a database system, and a fraud detection system. The unification engine receives user requests from data centers. The unification engine processes the user requests to unify them into user sessions. The database system stores elements associated with the user sessions in a memory module. The fraud detection system determines whether a first user session is fraudulent using at least a portion of the elements stored in the memory module.

In another aspect, there is another system for detecting fraudulent activity on a network using stored information. The system includes a means for unifying user sessions, a means for storing elements, and a means for fraud detection.

The means for unifying users sessions receives user requests from data centers and processes the user requests to form user sessions. The means for storing elements stores elements associated with the user sessions in a memory module. The means for fraud detection processes a first user session using the elements stored in the memory module to determine if the first user session is fraudulent.

In another approach, the user sessions on a network are analyzed to detect and interdict fraudulent activity on the network. In another aspect, there is a method for detecting and interdicting fraudulent activity on a network. The method includes receiving user requests from data centers and combining the user requests to form a user session. The user sessions are analyzed to detect fraudulent activity, and if fraudulent activity is detected, then the user session is interdicted.

In another aspect, there is a computer program product for detecting and interdicting fraudulent activity on a network. The computer program product is tangibly embodied in an information carrier. The computer program product includes instructions being operable to cause a data processing apparatus to receive user requests from data centers. The user requests are combined to form a user session. The user session is analyzed to detect fraudulent activity. If fraudulent activity is detected, then the user session is interdicted.

In another aspect, there is a system for detecting and interdicting fraudulent activity on a network. The system includes a unification engine, a fraud detection system, and a session interdiction system. The unification engine receives user requests from data centers and combines the user requests to form a user session. The fraud detection system analyzes the user sessions to detect fraudulent activity. When fraudulent activity is detected, the session interdiction system interdicts the user session.

In another aspect, there is a system for detecting and interdicting fraudulent activity on a network. The system includes a means for unifying user sessions, a means for fraud detection, and a means for session interdiction. The means for unifying user sessions receives user requests from data centers and combines the user requests to form a user session. The means for fraud detection analyzes the user session to detect fraudulent activity. When fraudulent activity is detected, the means for session interdiction interdicts the user session.

In another approach, the reconstructed data on a network is distributed to subscribers on a network. In another aspect, there is a method for subscribing to data feeds on a network. The method includes receiving data packets from data centers and then processing the data packets. The data packets are reconstructed to form data in a format that conforms with a particular protocol. All or part of the reconstructed data is transmitted to requestors.

In another aspect, there is a computer program product for subscribing to data feeds on a network. The computer program product is tangibly embodied in an information carrier. The computer program product includes instructions being operable to cause a data processing apparatus to receive data packets at a data bus. The data packets can be from a plurality of data centers. The data packets from a plurality of data centers are transmitted from a same user location to different data centers. The data packets are processed by the computer program product. Data in a particular protocol is reconstructed from the data. At least a portion of the data is requested by a requester. The requested data is transmitted to the requester.

In another aspect, there is a system for subscribing to data feeds on a network. The system includes a data bus which receives data packets from a plurality of data centers. The system includes a reconstruction engine which reconstructs data from the data packets. The data is reconstructed into a format that conforms with a particular protocol. The system includes a request module which receives requests from requesters for a portion of the reconstructed data. The request module transmits the requested reconstructed data to the requester.

In another aspect, there is a system for subscribing to data feeds on a network. The system includes a means for receiving data packets from a plurality of data centers. The system includes a means for reconstructing data from the data packets to a format that conforms with a particular format and a means for requesting reconstructed data which receives a request for at least a portion of the reconstructed data and transmits the requested data to a requester.

In other examples, any of the aspects above can include one or more of the following features. The data centers receive the data packets from a load balancer. The load balancer sends the data packets to the different data centers according to the available capabilities of the data centers, the conditions of the network, quality of service indicators on the data packets, application availability, number of connections to each data center, and/or pre-defined routing instructions. Servers at the data centers process the data packets at or near the same time and separately from the reconstruction engine reconstructing the data. The processing of the data packets includes decrypting a data packet, and/or filtering a data packet.

In yet other examples, the protocol that the data is formatted into is hypertext transport protocol (HTTP), voice over internet protocol (VoIP), transmission control protocol (TCP), and/or internet protocol (IP). The hypertext transport protocol (HTTP) is converted into an open standard message protocol. The profiling engine can be a geolocation profiling engine, and/or behavior profiling engine. The rule engine can be an application rules engine, and/or transactional rules engine. The memory module is volatile memory and/or persistent storage.

In other examples, the interdiction of the user session requires the user to authenticate onto the network, notifies the user of the fraudulent activity, cuts off the user session from the network to stop the fraudulent activity, and/or directs the user session to a separate network to mitigate the fraudulent activity. The interdiction of the user occurs by communicating to the authentication system to prevent the user session from accessing the network. The interdiction of the user occurs by generating a rule based on the fraudulent activity and communicating the rule to the authentication system which stops access to the system.

In yet other examples, the subscription request is for a set time period. The requester is a marketing analytical engine, a network intrusion detection system, a customer service systems, and/or a performance analysis system.

Any of the aspects and examples above can provide one or more of the following advantages. They can reconstruct data and/or unify user sessions from multiple data centers. The reconstructed data and/or unified user sessions can be used for analysis as a complete or partial representation of a user's activity. The reconstruction of data packets into data allows for an improved representation of the user's activity to be analyzed, since data packets from only one data center most likely only shows the user's interactions with that data center and not the interactions with all of the data centers. A representation of the user's activity allows for a holistic analysis of the activity to detect fraudulent activity, to provide feedback to the user and of the system, and/or to improve performance of the system.

Other advantages include the unification of user requests into user sessions for fraud detection. The unification of user requests that are transmitted to a plurality of data centers allows the fraud detection system to analyze an improved representation of the user's activity. This improved representation of the user's activity is more than the user's interactions with one data center in the plurality of data centers. It is part or all of the user's activity with the plurality of data centers. This allows the user's activity to be analyzed as a whole instead of piece by piece.

Other advantages include the capture of data packets and/or user requests from the network without interfering with the transmission of the data packets and/or user requests to the rest of the network (e.g., the server system). The processing of the data packets and/or the user requests by the server systems is not interfered with by the capture of the data packets and/or the user requests.

Other advantages include the processing of the data and/or user session by the fraud detection system in real time. The data collection system collects the data packets and/or user requests at the same time that the server systems receive the data packets and/or user requests. The reconstructed data and/or unified user sessions are processed by the fraud detection system at the same time that the server system processes the data and/or user request. The real time fraud detection allows for the interdiction of fraudulent activity before the fraudulent activity can harm the system (e.g., the fraud detection system can stop fraudulent transactions before the fraudulent transaction is completely processed).

Other advantages include the memory module being volatile memory. The processing of data and/or user sessions to determine whether fraudulent activity exists occurs in real time. The fraud detection system utilizes the fast access capabilities of the volatile memory to access the elements stored in the memory module and analyze the data and/or user sessions using the stored elements in real time.

Other advantages include the data bus subscription service. The data bus subscription service is the subscription of data feeds on the network. The subscription of data feeds on the network allows other requestor systems to access the data that is collected from the plurality of data centers. By providing the subscription service, the other requestor systems, such as a performance analysis system and a customer service system, can analysis the entire representation of the user's activity instead of just a portion of the user's activity that is transmitted through one data center out of the plurality of data centers.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

Figure 1:
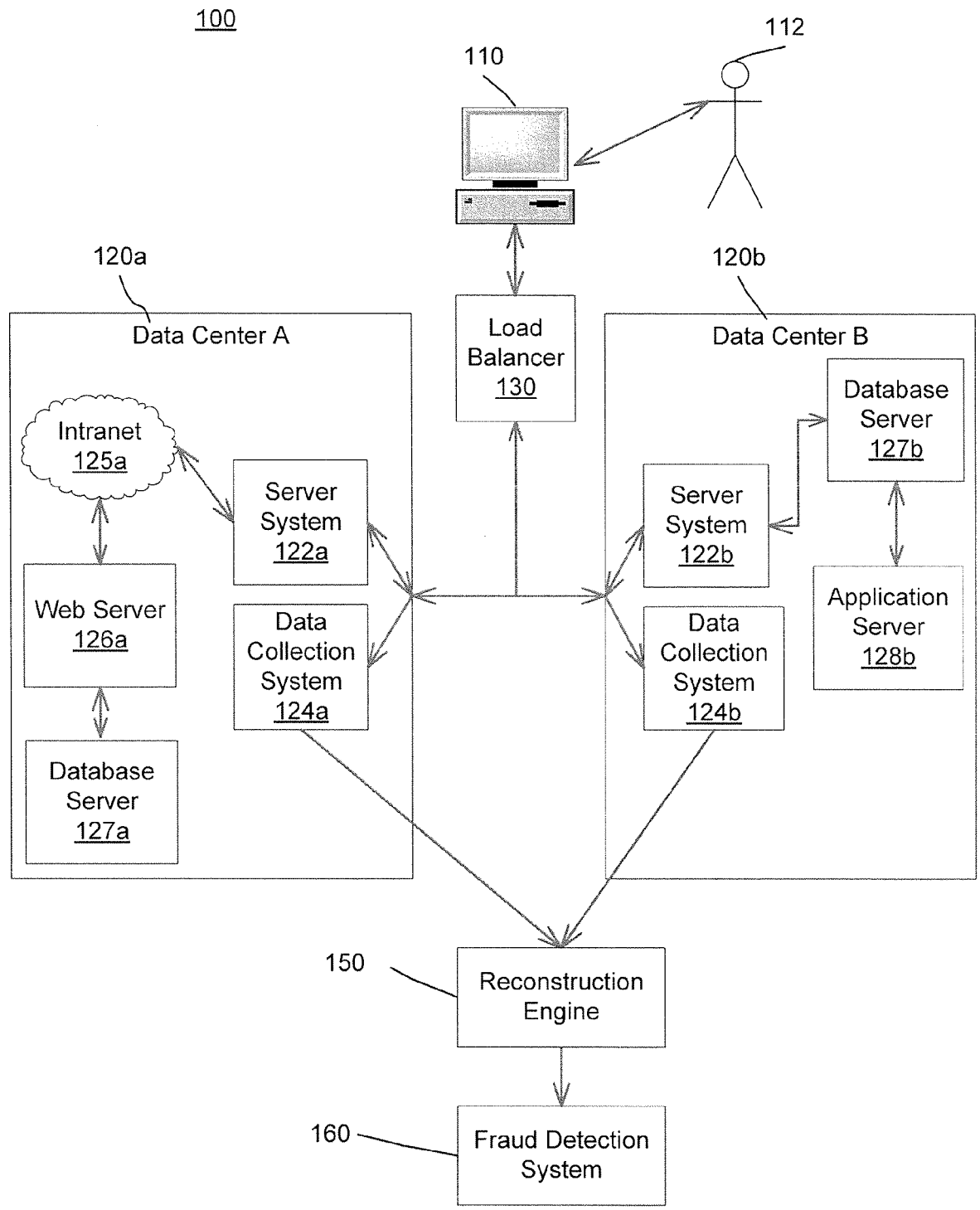
FIG. 1 is a functional block diagram of an exemplary system which reconstructs the data transmitted on the system and transmits the data to a fraud detection system.

FIG. 1 is a functional block diagram of an exemplary system 100 which reconstructs the data transmitted on the system and transmits the data to a fraud detection system 160. In some examples, the data includes records of interactions between the user 112 and the system 100. The records of interactions include, for example, buy and sell orders from the user 112 to a brokerage company and/or credit card transactions of the purchase of products and services by the user 112.

The transmission on the system 100 can occur over packet-based networks and/or circuit-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The system 100 includes the user 112 who interacts with a transmitting device 110 which transmits data in one or more parts as data packets to a load balancer 130. In some examples, the user 112 uses any type of transmitting device 110 to transmit the data packets. The transmitting device 110 includes, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer®, Mozilla® Firefox). The mobile computing device includes, for example, a Blackberry®.

The load balancer 130 can be a network system. The network system includes, for example, a network router, a network switch, a network hub, a computer and/or other communication devices. The network system includes, for example, one or more network adapters (e.g., 10/100/1000 Base-T network interface adapter card (NIC), 1000 Base-SX NIC, 1000 Base-LX NIC, 1000 Base-FX NIC). The network system includes one or more modules that process the data packets. The module is implemented in digital electronic circuitry, computer hardware, firmware, and/or software. The module includes, for example, a data routing module, an internet protocol (IP) routing module, a domain name service (DNS) routing module, and/or other routing modules.

In some examples, the system 100 receives data packets from other systems. The other systems include one or more network systems that each contain one or more transmitting devices 110. The other systems transmit data to the load balancer 130 for transmission to the data centers 120a and 120b for processing.

The load balancer 130 transmits the data packets to the different data centers 120a or 120b based on load balancing techniques. In some examples, the load balancer 130 transmits the data packets to a data center selected from the plurality of data centers 120a and 120b according to the available capabilities of the data centers (e.g., processor availability, disk capacity), the conditions of the network (e.g., packet trip time, packet losses), a quality of service indicators on the data packet, application availability, number of connections to each data center, and/or a pre-defined routing instruction.

FIG. 1 shows an exemplary system 100 with data centers A 120a and B 120b. Although the system 100 is shown with two data centers 120a and 120b, other examples include any number of data centers (e.g., three, four, ten, twenty, one hundred, one thousand, ten thousand). Similarly, although the system 100 illustrates one load balancer 130, other examples contain a plurality of load balancers in multiple layers. For example, a user's transmitting device 110 transmits data packets to the first load balancer 130 which then has a layer of load balancers to which the first load balancer 130 transmits the data packet. The second load balancer on the layer below the first load balancer 130 transmits the data packet to a data center selected from the plurality of data centers.

The data packets in the data centers 120a and 120b are transmitted to the server systems 122a and 122b and the data collection systems 124a and 124b, respectively. For example, a data packet is transmitted from the user's transmitting device 110 to the load balancer 130. The data packet is transmitted to data center A 120a from the load balancer 130. The data packet is transmitted in the data center A 120a to the server system 122a and to the data collection system 124a.

The transmission of the data packet in the data center A 120a to the server system 122a and to the data collection system 124a can occur simultaneously and independently from each other using for example, a network device. The network device includes, for example, a network router, a network firewall, a network hub, a network switch, a computer, and/or other network devices (e.g., Gigamon Giga-VUE-MP available from Gigamon Systems LLC).

The server systems 122a and 122b each can include one or more servers (e.g., 126a, 127a, 127b, and 128b). The server includes, for example, a web server (e.g., 126a), an application server (e.g., 128b) (e.g., Oracle®E Application Server 10g available from Oracle Corporation), a database server (e.g., 127a and 127b) (e.g., Oracle® Database 10g available from Oracle Corporation), a communication server, a fax server, a file server, a game server, an authentication server (e.g., RSA® Authentication Manager available from RSA Security Inc.), a desktop computer, a central ad server, a file transport protocol server, an image server, a mail server, a news server, a proxy server, a printer server, a sound server, a streaming media server, a terminal server, a firewall, a network router, a network hub, a network (e.g., an intranet 125a) and/or a network switch.

In some examples, the data collection system 124a and 124b includes one or more computing devices which can be, for example, a computer, a laptop computer, a network router, a network switch, and/or a network hub (e.g., Radware® AS4 available from Radware Ltd., Covelight Inflight™ 5000 available from Covelight System, Inc., Gigamon GigaVUE-MP available from Gigamon Systems LLC).

The data collection systems 124a and 124b can capture the data packets from the network without interfering with the transmission of the data to the rest of the network. For example, the data collection system 124a receives data packets transmitted to the data center 120a from the load balancer 130 while at the same time the data packets are received by the server system 122a, creating a parallel path for receiving the data packets.

The data collection systems 124a and 124b can capture the data packets transmitted by the server systems 122a and 122b, respectively, back to the user. For example, the user 112 using a transmitting device 110 transmits a data packet requesting information. The data packet is routed through the load balancer 130 to data center B 120b. The data packet is transmitted to the server system 122b and the data collection system 124b. The server system 122b processes the data packet and responds to the user's request by transmitting a data packet response. The data packet response is captured by the data collection system 124b.

The data packet and/or data packet response are transmitted from the data collection systems 124a and 124b to the reconstruction engine 150. The reconstruction engine 150 receives data packets from the plurality of data centers 120a and 120b. The reconstruction engine 150 processes the data packets to form part or all of the data from the user 112. The reconstructed data is a representation of part or all of the information transmitted over the network by the user's transmitting device 110 (e.g., the raw information that is transmitted over the network).

The processing of the data packets by the server system 122a can occur at or near the same time and separately from the reconstruction engine 150 reconstructing the data. For example, the data packets are transmitted through the server system 122a for processing at or near the same time as the data collection system 124a transmits the data packets to the reconstruction engine 150 and the reconstruction engine 150 is reconstructing the data packets into data. The processing by the server system 122a includes, for example, the transmission of the data packets received by the server system 122a to an intranet 125a which transmits the data packet to a web server 126a. The web server 126a processes the data packet to determine if the web server 126a needs to respond to the data packet and/or if the web server 126a needs to access information from the database server 127a. The web server 126a needs information from the database server 127a to respond to the data packet (e.g., a search submission to a search module that is part of the web server 126a). The web server 126a queries the database server 127a and the database server 127a responds to the query (e.g., the information that is requested from the search). The web server 126a processes the information returned from the query and transmits a web page with the requested information back to the transmitting device 110 of the user 112 through the intranet 125a.

The reconstruction engine 150 can analyze the data packets to determine data packet information. The data packet information includes a destination parameter, and/or an origination parameter. The data packet parameters can be used by the reconstruction engine 150 to match data packets together to form the data of the user 112. The data packet parameters includes a network address, a user address, an operating system (OS) fingerprint, a network card address, a user cookie, form data, an encryption key, and/or a transaction identifier. The network address includes the address of the transmitting device 110 transmitting the data packet, the address of the network address translation device (e.g., firewall) that transmits the data packet, or other network devices that transmit data packets. The user address includes the address of the user 112 at the transmitting device 110 transmitting the data packet, identifying information of the user's transmitting device 110, or other identifying information that is associated with the user 112. The OS fingerprint includes the formatting of the data that indicates the OS that transmits the data packet, identifying information in the data packet from the OS, or other identifying information that is associated with the OS. The network card address includes the address of the network card in the user's transmitting device 110 or other identifying information of the transmitting device that is associated with the transmitting device 110. The user cookie includes information stored on the user's transmitting device 110 (e.g., information stored in a web browser on the user's transmitting device 110) or other identifying information that is stored on the user's transmitting device 110. The form data includes information in the data packets associated with the user 112 (e.g., information in the data packet such as UserID=GeorgeSmith) or other identifying information in the data packets.

In some examples, the reconstruction engine 150 processes the data packet to determine if the data packet matches a request from the server systems 122a and 122b. For example, the server system 122a transmits a request for information (i.e., a data packet requesting information from a user 112) to a user 112 (e.g., login information—userid and password). The user 112 responds through the transmitting device 110 by transmitting a data packet (e.g., userid and password). The reconstruction engine 150 matches the request for information from the server system 122a to the data packet from the user 112 (e.g., the request for login information to the login information). The matching of the request for information from the server system 122a to the data packet from the user 112 is used by the reconstruction engine 150 to match data packets together.

The reconstruction engine 150 can process the data packets. The processing of the data packets includes filtering, decrypting, and/or encrypting (e.g., Radware® SSL Decryption available from Radware Ltd.). The filtering includes, for example, filtering by an internet protocol address, a protocol, a data type (e.g., graphic interface format (gifs), hypertext markup language (html), joint photographic experts group kjpegs), cascading style sheets (css), javascript (js)), a parameter (e.g., password, pin, personal identifying information), content, a content-type, an uniform resource locator (URL) path, and/or an internet protocol (IP) range.

The reconstruction engine 150 receives, for example, over one billion data packets per hour. For example, the reconstruction engine 150 can filter out data packets that are from a trusted internet protocol address (e.g., address 10.111.23.12 which is from a trusted data center). The reconstruction engine 150 filters out all of the data packets from the trusted internet protocol address to reduce the load on the reconstruction engine 150. For example, the reconstruction engine 150 can filter out parameters, such as passwords and pin numbers, to protect sensitive information from being transmitted to the fraud detection system 160.

The reconstruction engine 150 transmits the data to the fraud detection system 160. The fraud detection system 160 processes the data to detect fraudulent activity. The processing of the data includes, for example, one or more systems that process the data (e.g., TIBCO® BusinessEvents® available from TIBCO Software Inc., Deep Network Analyzer (DNA) available from SourceForge®).

Figure 2:
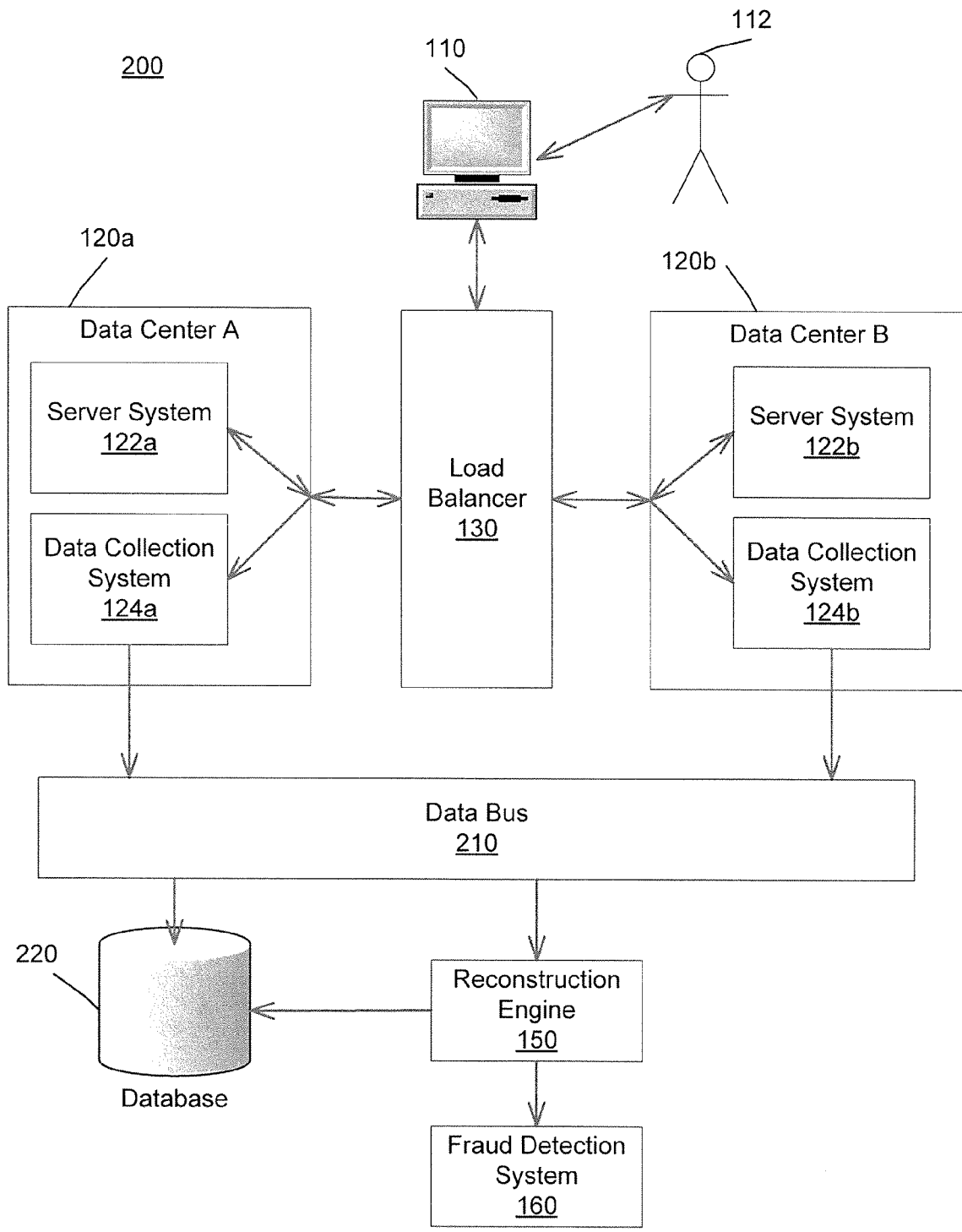
FIG. 2 is a functional block diagram of an exemplary system depicting the data being transported from the data centers to a data bus.

FIG. 2 is a functional block diagram of an exemplary system 200 depicting the data being transported from the data centers 120a and 120b to a data bus 210. The system 200 includes the user 112 using the transmitting device 110 which transmits data in one or more parts as data packets to the load balancer 130. The load balancer 130 transmits the data packets to a data center in the plurality of data centers 120a and 120b based on load balancing techniques. The data packets are transmitted to the server systems 122a and 122b and to the data collection systems 124a and 124b, respectively.

The data collection systems 124a and 124b transmit the data packets to the data bus 210. In some examples, the data bus 210 aggregates the data packets from the plurality of data centers 120a and 120b for distribution to the systems that need and/or request the data such as the reconstruction engine 150.

The data packets are transmitted from the data bus 210 to a database 220 and to the reconstruction engine 150. The reconstruction engine 150 reconstructs data from the data packets received from the plurality of data centers 120a and 120b. The reconstructed data is transmitted to the fraud detection system 160 and the database 220.

In some examples, the data bus 210 includes one or more computer systems connected to the network (e.g., a computing blade, a network server, a network router, a network switch, a network hub). In some examples, the database 220 stores data packets and/or data. The database 220 includes, for example, a memory module. The memory module includes, for example, persistent storage and/or volatile storage.

Figure 3:
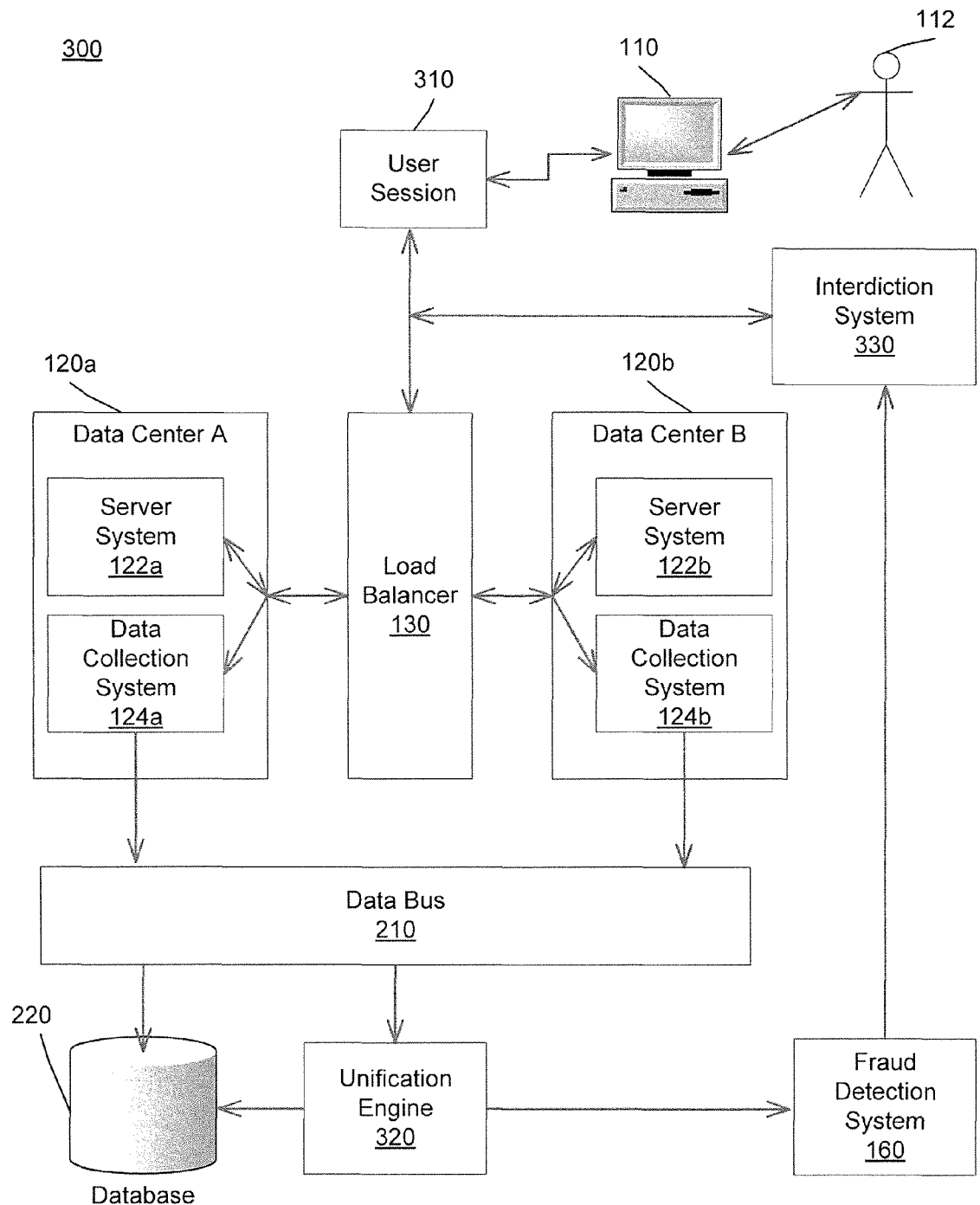
FIG. 3 is a functional block diagram of an exemplary system showing the unification of user sessions from user requests.

FIG. 3 is a functional block diagram of an exemplary system 300 showing the unification of user sessions from user requests. The system 300 includes the user 112 who has a user session 310. The user session 310 is a compilation of all of the user requests associated with the user 112. The user 112 is requesting and receiving information from the system 300. This information requesting and receiving is accomplished through user requests.

The user requests are transmitted to the load balancer 130. The load balancer 130 transmits a user request to a data center 120a or 120b based on load balancing techniques. The user request is transmitted to the server system 122a or 122b and the data collection system 124a or 124b based on the data center (e.g., 120a or 120b) to which the user request is sent. The data collection system 124a or 124b transmit the user request to a data bus 210. The user request is transmitted from the data bus 210 to the database 220 and an unification engine 320. The unification engine 320 combines all of the received user requests from the user 112 to form an unified user session which comprises all or part of the user session 310, which was initially split apart for transmission to the data centers 120a and 120b. The unified user session can, for example, include a representation of part or all of the user's activity including interactions that are not transmitted through the transmitting device 110 over the network (e.g., information associated with applications on the transmitting device such as an application that interfaces with the server systems 122a and 122b).

The unification engine 320 can analyze the user requests to determine user request information. The user request information includes an origination parameter and/or a destination parameter. One or more of the user request parameters are, for example, used by the unification engine 320 to match user requests together to form the unified user session of the user 112.

The unification engine 320 can analyze the user requests to determine if the user request matches a request for information from the server systems 122a and 122b and/or a request for information from an application module associated with the user's transmitting device 110 (e.g., client side application that communicates with the server systems 122a and 122b). For example, the application module associated with the user's transmitting device 110 requests information from the user 112. The user 112 inputs the information into the application module. The application module through the transmitting device 110 transmits the information in the form of an user request to the server system 122a or 122b for processing. The unification engine 320 matches the user request with information that is requested by the application module (i.e., the unification engine 320 is aware of what information is requested by application modules so that it can match the information to user requests). The matching of the request for information from the application module to the user request form the user 112 is used by the unification engine 320 to match user requests together to form user sessions.

The unification engine 320 can process the user requests. The processing of the user requests includes, for example, filtering, decrypting, and/or encrypting.

The user session unified by the unification engine 320 is transmitted to the database 220 for storage and to the fraud detection system 160. If the fraud detection system 160 detects fraudulent activity, then the fraud detection system 160 communicates to the interdiction system 330. The interdiction system 330, for example, stops the communication of the user requests to the load balancer 130.

Figure 4:
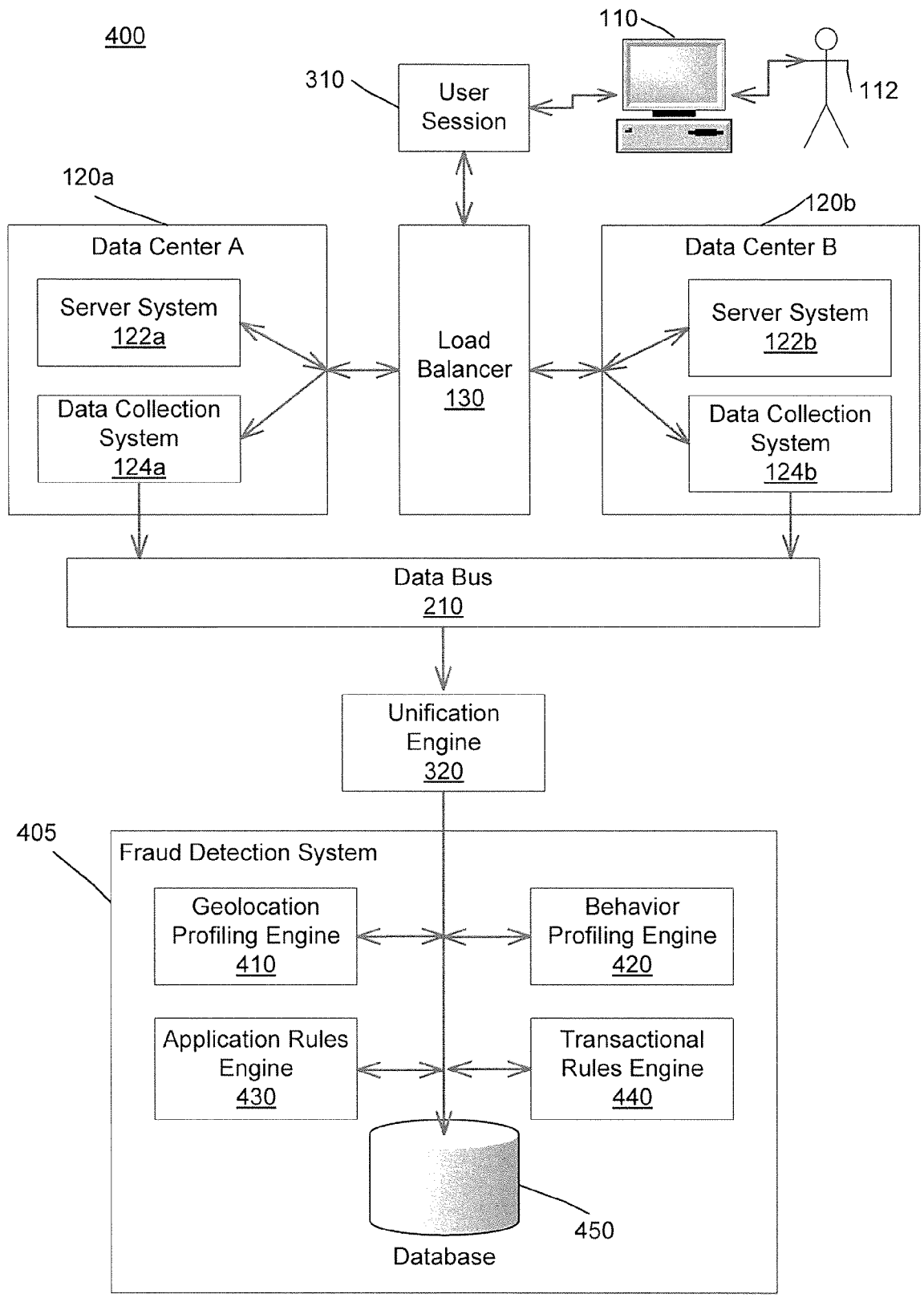
FIG. 4 is a functional block diagram of an exemplary system depicting parts of the fraud detection system including a database of user sessions.

FIG. 4 is a functional block diagram of an exemplary system 400 depicting parts of a fraud detection system 405 including a database 450 of user sessions. Parts of the exemplary system 400 are described above in FIGS. 1, 2, and 3.

The unification engine 320 unifies the user requests and transmits the unified user session to the fraud detection system 405. The fraud detection system 405 includes a geolocation profiling engine 410, a behavior profiling engine 420, an application rules engine 430, a transactional rules engine 440, and a database 450. The fraud detection system 405 can, for example, include one of the engines or combinations of the engines.

The geolocation profiling engine 410 analyzes the user location, the network path, and/or the network address. For example, the geolocation profiling engine 410 analyzes the network address of the transmitting device 110 to determine if the network address is one that is known as a suspicious address (e.g., a network address from a foreign country that is known to have a high amount of fraudulent activity). The determination that the network address is suspicious includes all or part of the information analyzed by the fraud detection system 405 to determine whether the activity is fraudulent. For example, the geolocation profiling engine 410 analyzes the network path of the user 112 to determine if the pathway that the user 112 is accessing travels through or is intercepted by a suspicious network. If the network path of the user 112 is being intercepted by a suspicious network, the geolocation profiling engine 410 reports the fraudulent activity to the fraud detection system 405.

The behavior profiling engine 420 analyzes behavior by analyzing how many page views without a logon occur, visits with malicious software, search terms that are categorized as suspect, uniform resource locators (URL) that are categorized as suspect, account access that is categorized as rapid access, access into multiple accounts, multiple network connections per session, and/or multiple users per session.

For example, if the user 112 accesses ten different accounts which are not interconnected, then the behavior profiling engine 420 determines that the user activity is fraudulent and reports the fraudulent activity to the fraud detection system 405. However, if the user 112 accesses ten different accounts but the accounts are all interconnected (e.g., all have the same mailing address, the same unique user identifier), then the behavior profiling engine 420 determines that the user activity is not fraudulent.

The behavior profiling engine 420 includes an anomaly-based profiling engine. The anomaly-based profiling engine uses a baseline of normal activity to detect when activity falls outside of the baseline. The baseline of normal activity can, for example, be programmed into the profiling engine, and/or learned by the profiling engine while processing the information, data, and/or user sessions on the network. The activity includes any event, state, content, behavior, transaction, and/or similar processing by the user 112 with the network 400.

For example, the user 112 changes her email address on the exemplary system 400 from an internet service provider (e.g., standarduser at standardisp.com) that the user had been using for ten years to an email address at a generic easily obtained email hosting service (e.g., genericuser at hotmail.com). This change of the user's email address may be normal behavior for some users but for this particular user 112, the change in email addresses falls outside of the normal behavior and the behavior profiling engine 420 classifies the activity as fraudulent activity. The classification of the activity as fraudulent activity requires, for example, the user 112 to confirm the change of email addresses outside of the communication channel in which the email change was submitted (e.g., if the email address change was through a website associated with the system 400, then the email address change confirmation outside of the communication channel is a phone call from the system 400).

The application rules engine 430 monitors the interactions between the modules of the exemplary system 400. The application rules engine 430 monitors, for example, a login module, a search module, a transaction module, an information module, and/or other modules that are part of the exemplary system 400. The application rules engine 430 monitors the modules of the exemplary system 400 for the detection of an interaction that is outside of the normal range of interactions with the module (e.g., violates a rule in the engine). The monitoring of the modules allows for the fraud detection system 405 to detect patterns of fraud that may not be detected by just analyzing the transaction of an user, but may be detected by analyzing the interactions with the applications of the exemplary system.

For example, a set of users is attempting to exploit a security hole in the authentication module. The application rules engine 430 is monitoring the authentication module and detects that the set of users is attempting to authenticate to the system 400 using the same username and password (e.g., a buffer overflow in the username and/or password fields). The normal range of interactions is not for more than one user to attempt to authenticate to the system 400 using the same username and password. Accordingly, the application rules engine 430 determines that the activity of the set of users is fraudulent.

The transactional rules engine 440 assigns a confidence level to the user session. The confidence level is an analysis to determine the level at which the system 400 ranks the user session. For example, if the user 112 is transmitting from a location that is within the user's profile (e.g., the user's home computer), but the transaction by the user 112 is outside of the user's profile (e.g., transferring all of the money in a money market account to an overseas bank account when the user never transferred money to an overseas bank account), then the confidence level of the user session is assigned a low number. This low number is utilized by the transactional rules engine 440 and/or the fraud detection system 405 to determine whether the activity is fraudulent.

However, for example, if the user 112 is not coming from a location that is within the user's profile (e.g., a hotel in New York City when the user never logged in from New York City before), but the transaction by the user 112 is within the user's profile (e.g., transferring all of the money in a money market account to an overseas bank account when the user transfers money to an overseas bank account every other week) and the computer signature of the computer that the user is using matches the computer signature in the user's profile (e.g., the user is using her laptop normally used at home at the hotel in New York City), then the confidence level of the user session is a higher number since the transaction is within the user's normal behavior although the user is logging in from a location outside of the user's profile. This high number is utilized by the transactional rules engine 440 and/or the fraud detection system 405 to determine whether the activity is fraudulent.

The transactional rules engine 440 includes a signature-based rules engine. The signature-based rules engine searches for pre-defined patterns (e.g., signatures) in the user session. The patterns include, for example, a set of conditions that characterize fraudulent activities. For example, http headers and/or http payload content are analyzed to detect variable overwriting, parameter overloading, and/or other types of activity that indicate fraudulent activity may be occurring.

For example, the user 112 is submitting a request to transfer $1,000,000 from an account to an overseas bank account. The transactional rules engine 440 is monitoring the activity and examines the http payload content to ensure that the content corresponds with the information of the activity. The http payload content contains userid=GeorgeRich while the user is logged on as userid=GeorgeFraud. The user 112 is attempting to transfer funds not from his account but from another user's account by changing the userid parameter in the http payload content. The transactional rules engine 440 detects this discrepancy and classifies the user session as fraudulent.

The database 450 stores elements of the user sessions in a memory module. The elements include, for example, user identification, network address, time, network path, length of time logged into the system, transactions, and/or other information contained in the user session. The memory module is, for example, volatile memory to speed the access of the stored user sessions. The memory module is, for example, persistent storage to keep for historical analysis (e.g., Oracle® Berkeley DB available from Oracle Corporation).

For example, the fraud detection system 405 searches the user sessions stored in the database 450 for access by the same network address and/or network subnet. If elements of the user session resemble and/or matches elements stored in the database 450 that have been associated with fraudulent activity, then the fraud detection system 405 classifies the user session as fraudulent (e.g., stored element is that subnet 10.10.10.0 is associated with fraudulent activity, then the user session from 10.10.10.5 is classified as fraudulent).

For example, the database 450 stores all of the transaction amounts for all bond purchases in volatile memory for fast access. The fraud detection system 405 receives a user session from the unification engine 320. The user session is processed by the fraud detection system 405 to determine if fraudulent activity exists. Part of the processing by the fraud detection system 405 is comparing the transaction amount in the user session to previous transaction amounts for the bond that is being purchased. The stored elements in the database 450 for the bond being purchased includes ten years of transactions with over a hundred thousand transactions per year. The fraud detection system 405 retrieves from the database 450 in volatile memory the over one million transactions to analyze whether the transaction in the user session is fraudulent activity. The fraud detection system 405 utilizes the speed of the database 450 in volatile memory (e.g., random access memory) to process the transaction at or near the same time that the server system 122a or 122b is processing the transaction. If the transaction in the user session (e.g., purchase of 9,232 bonds) is within the normal ranges (e.g., the range of purchases is 1 to 10,342), then the fraud detection system 405 does not interdict the transaction. If the transaction in the user session (e.g., the purchase of 132,230 bonds) is not within the normal range (e.g., the range of purchases is 1 to 10,342), then the fraud detection system 405 interdict the transaction.

Figure 5:
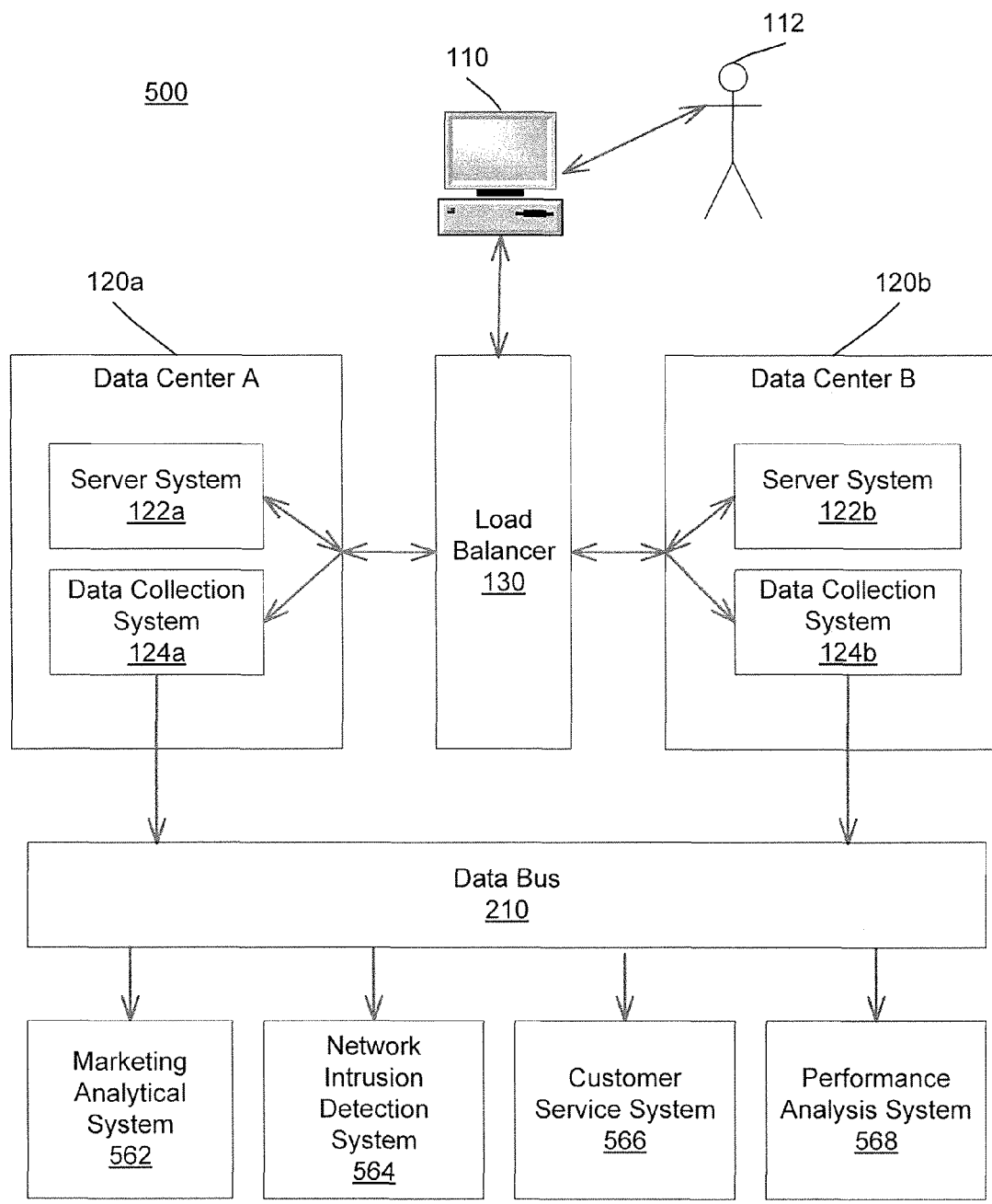
FIG. 5 is a functional block diagram of an exemplary system showing systems that receive data from the data bus.

FIG. 5 is a functional block diagram of an exemplary system 500 showing requestor systems that receive data from the data bus 210. Parts of the exemplary system 500 are described above in association with FIGS. 1, 2, 3, and 4. The data bus 210 transmits the data packets to the requestor system. In some examples, the requester system includes a marketing analytical system 562, a network intrusion detection system 564, a customer service system 566, and/or a performance analysis system 568.

The data packets received by the data bus 210 are, for example, reconstructed into data before being transmitted to the requestor system. The user requests received by the data bus 210 are, for example, unified into user sessions before being transmitted to the requester system. The data bus 210 includes, for example, the unification engine 320 as shown in FIG. 3 and/or the reconstruction engine 150 as shown in FIG. 1.

The data bus 210 receives the data packets and/or the user request as encrypted information from the data collection systems 124a and 124b. The data bus 210 decrypts the information before transmission to the requester system.

The data bus 210 processes the data packet and/or the user request into a format that conforms with a particular protocol. The particular protocol includes a voice over internet protocol (VoIP), a transmission control protocol (TCP), an internet protocol (IP), an extensible markup language (XML), a hypertext markup language (HTML), and/or a standard generalized markup language (SGML).

Figure 6A:
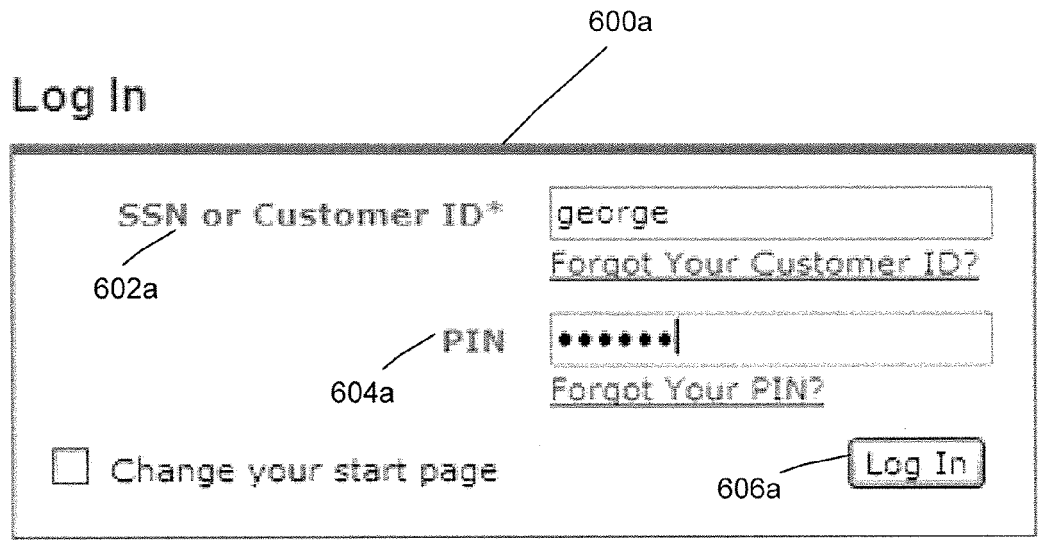
FIG. 6A is a screen shot of a login module.

FIG. 6A is a screen shot 600a generated by a login module. The screen shot 600a shows the login screen generated by the login module that is included in the network associated with the load balancer 130 of FIG. 1. The login screen includes a customer identification field 602a, a pin field 604a, and an information submission button 606a. The fields 602a, 604a, and 606a are part or all of the information in the user request.

Figure 6B:
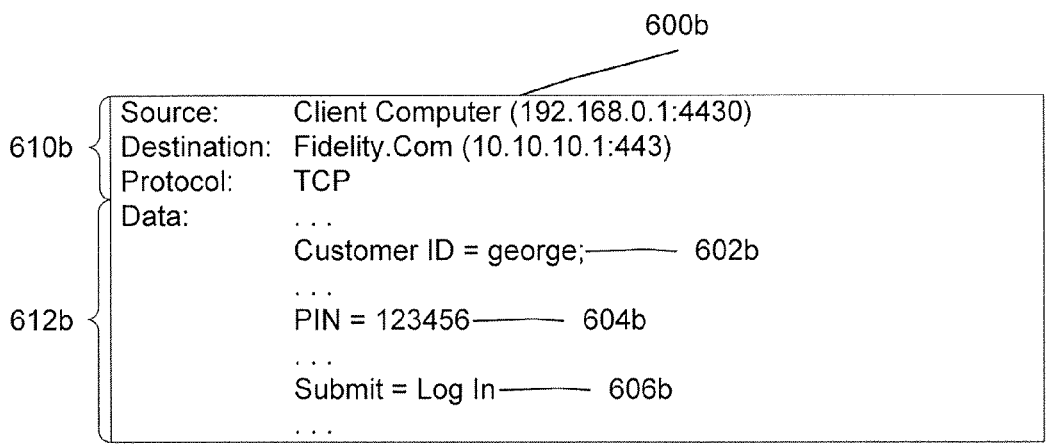
FIG. 6B is a diagram of information sent to a login module.

FIG. 6B is a diagram 600b of information sent from the transmitting device 110 of FIG. 1 to the login module that includes the information in FIG. 6A. The diagram 600b is part or all of the data packet and/or the user request. The information parameters 610b define how the information is routed and/or processed. The information parameters 610b include the source of the information, the destination of the information, routing information, the protocol for the information, and/or other types of transmitting parameters. The information data 612b includes the content information. The information data 612b includes formatting information, content information, transaction information, and/or other types of content information. The transaction information can comprise the customer id 602b which corresponds with the customer id field of the login screen 602a. The transaction information can comprise the pin 604b which corresponds with the pin field of the login screen 604a. The transaction information can comprise the login in 606b command information which corresponds with the log in submission button 606a. The fields 602b, 604b, and 606b are part or all of the information in the data packet and/or the information in the user request.

The exemplary system 300 of FIG. 3 unifies the user requests as illustrated by 600a and 600b into the user session. The user session is analyzed by the fraud detection system 160 to look for account access into multiple accounts. The fraud detection system 160 detects that the user 112 logging into the account previously logged into multiple other accounts in or near the same timeframe as the current login. The fraud detection system 160 determines that the access to the account is fraudulent and transmits the fraudulent activity information for the user 112 to the interdiction system 330. The interdiction system 330 cuts off the user 112 from accessing the system 300.

Figures 6C, 6D:
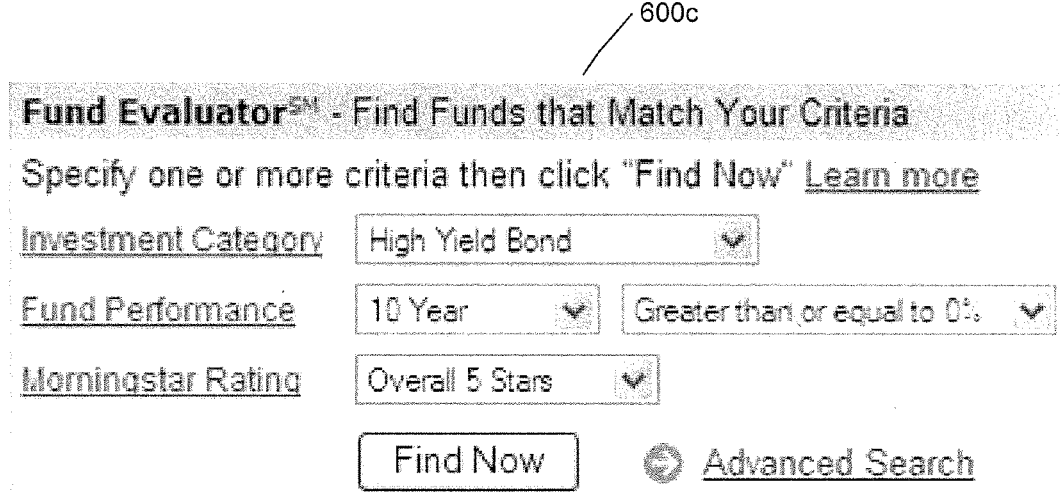
FIG. 6C is a screen shot of a search module.
FIG. 6D is a diagram of information transmitted to a search module.

FIG. 6C is a screen shot 600c generated by a search module in the server system 122a or 122b of FIG. 3. The fields in the screen shot 600c can comprise part or all of the information in the user request.

FIG. 6D is a diagram 600d of information transmitted from the transmitting device 110 of FIG. 3 to the search module in the server system 122a or 122b that includes the information in FIG. 6C. The diagram 600d is part or all of the data packet and/or the user request. The information parameters 610d define how the information is routed and processed. The information data 612d includes the content information.

Figure 6E:
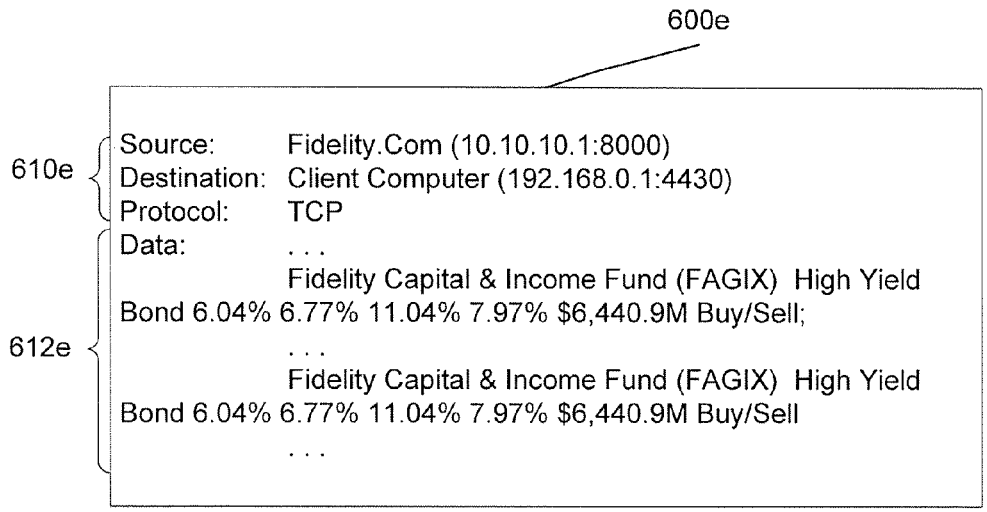
FIG. 6E is a diagram of information received from a search module.

FIG. 6E is a diagram 600e of information received from the search module in the server system 122a or 122b of FIG. 3. The diagram 600e is part or all of the data packet and/or the user request. The information parameters 610e define how the information is routed and processed. The information data 612e includes the content information.

Figure 6F:
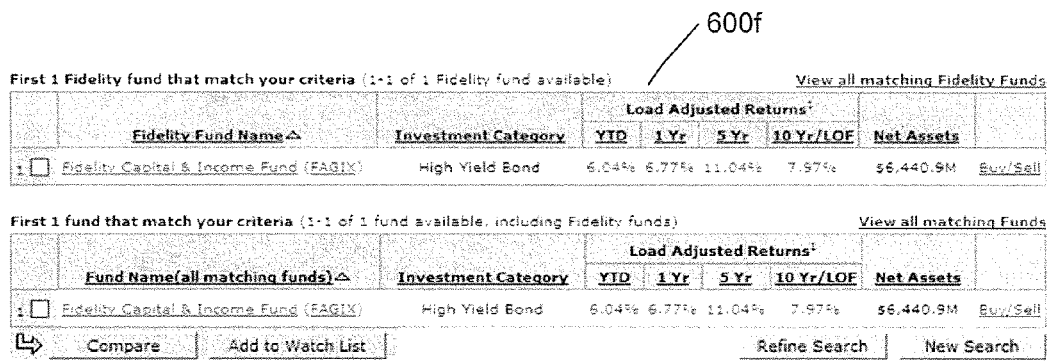
FIG. 6F is a screen shot of information received from a search module.

FIG. 6F is a screen shot 600f of information generated by the search module in the server system 122a or 122b of FIG. 3. The screen shot 600f shows the information received from a search module. The information shown in the screen shot 600f corresponds with the information 612e in the diagram of FIG. 6E.

Figure 6G:
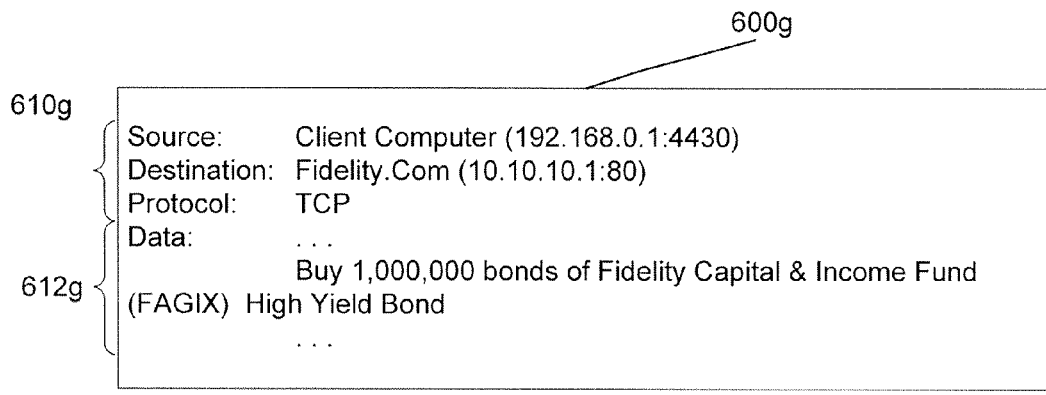
FIG. 6G is a diagram of information transmitted to a transaction module.

FIG. 6G is a diagram 600g of information transmitted to a transaction module in the server system 122a or 122b of FIG. 3. The diagram 600g is part or all of the data packet and/or the user request. The information parameters 610g define how the information is routed and processed. The information data 612g includes the content information.

Figure 6H:
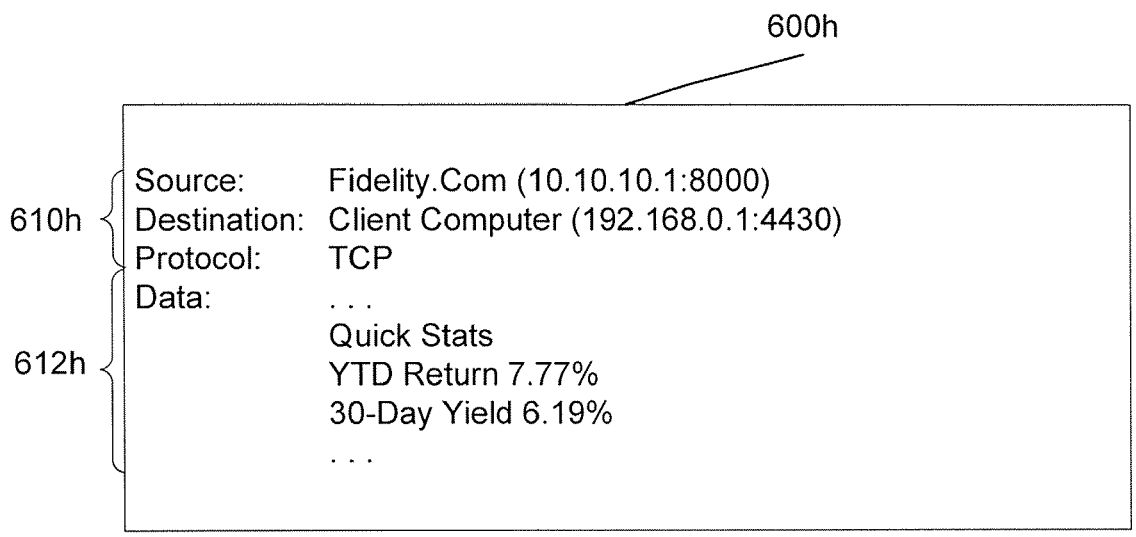
FIG. 6H is a diagram of information received from an information module.

FIG. 6H is a diagram 600h of information received from an information module in the server system 122a or 122b of FIG. 3. The diagram 600h is part or all of the data packet and/or the user request. The information parameters 610h define how the information is routed and processed. The information data 612h includes the content information.

Figure 6I:
FIG. 6I is a screen shot of information received from an information module.

FIG. 6I is a screen shot 600i of information generated by the information module in the server system 122a or 122b of FIG. 3. The information shown in the screen shot 600i corresponds with the information 612h in the diagram of FIG. 6H.

The diagrams of information 600b, 600d, 600e, 600g, and 600h represent data packets and/or user requests collected at the data collection system 124a or 124b of FIG. 1. The reconstructed data is a combination of all of the data packets collected at the data collection systems 124a and 124b. The reconstructed data is the information that is transmitted from the transmitting device 110 and from the server systems 122a and 122b (e.g., all of the raw packets that are transmitted over the system 100). The information included in the screenshots 600a, 600c, 600f, and 600i and the diagrams of information 600b, 600d, 600e, 600g, and 600h represent part or all of the user session. The user session is a representative of part or all of the user's activity including interactions that are not transmitted through the transmitting device 110 over the network.

For example, the transmitting device 110 includes an application for interacting with the server systems 122a and 122b. The interaction between the user 112 and the application on the transmitting device 110 is part of the user's activity and thus the user session includes the interactions between the application on the transmitting device 110 and the user 112. The unification engine 320 is aware of the applications that are used on the transmitting device 110 (e.g., by keeping information about the applications and the interactions with the applications in the database 220) and integrates the interactions associated with the applications into the unified user session.

Figure 7:
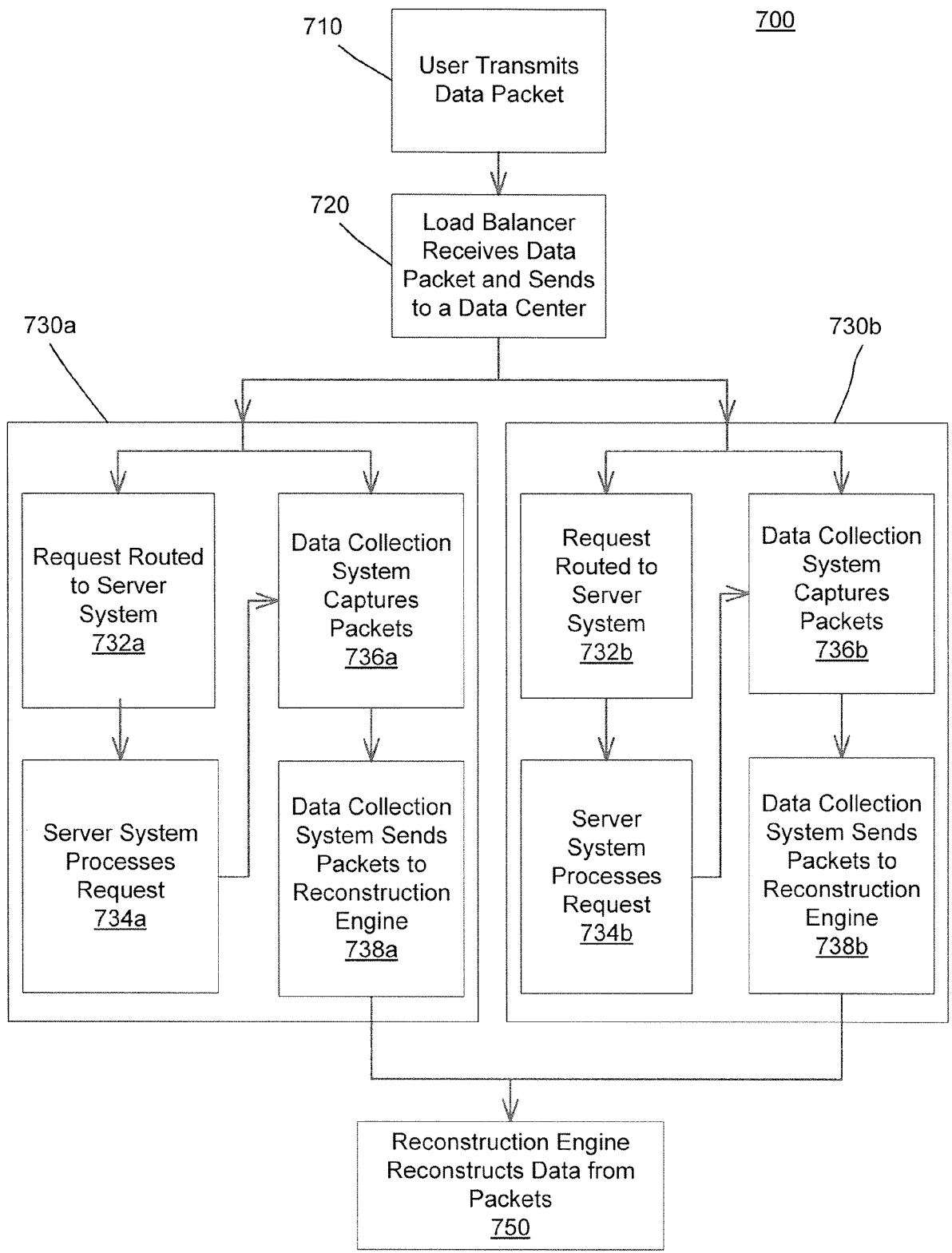
FIG. 7 is a flowchart depicting the transmission of data through an exemplary system.

FIG. 7 is a flowchart 700 illustrating a process of the transmission of data through the exemplary system 100 of FIG. 1. The user 112 transmits (710) the data packet using the transmitting device 110. The load balancer 130 receives the data packet and sends (720) the data packet to one of the data centers, 120a or 120b. FIG. 7 includes the processing performed at data center A 120a, illustrated as grouping 730a and the processing performed at data center B 120b, illustrated as grouping 730b. At either data center, the data packet is routed (732a and 732b) to the server systems 122a and 122b, respectively, and the data collection systems 124a and 124b capture (736a and 736b), respectively, the data packets. The data packet is processed (734a and 734b) by the server systems 122a and 122b, respectively. A response from the server systems 122a and 122b is routed back to the user and is captured (736a and 736b) by the data collection systems 124a and 124b, respectively. The data collection systems 124a and 124b send (738a and 738b) the data packets to the reconstruction engine 150. The reconstruction engine 150 receives the data packets from the data centers 120a and 120b. The reconstruction engine 150 reconstructs (750) the data from the data packets.

The reconstruction (750) of data packets can occur in several different ways. For example, the reconstruction (750) can include matching origination parameters between the data packets. Using, for example, the exemplary system 100 of FIG. 1 and the parts of the data of FIGS. 6A-6I, the reconstruction engine 150 reconstructs data packets into data. The data packets 600b, 600d, and 600g show the information parameters 610b, 610d, and 610g. The information parameters 610b, 610d, and 610g include the origination parameters (e.g., the source field). The source field shows that the data packets are originating from address 192.168.0.1. The origination field can be matched between the data packets by the reconstruction engine 150. The matched data packets are transformed into hypertext markup language (HTML) using the information data 612b, 612d, and 612g which contains HTML tags to form part or all of the data.

An advantage of the exemplary system 100 is that the data packets 600b, 600d, and 600g are routed to different data centers 130a and 130b by the load balancer 130 for processing (734a and 734b) by the server systems 122a and 122b and the data packets 600b, 600d, and 600g routed to the different data centers 130a and 130b are reconstructed into part or all of the data transmitted from and received by the user's transmitting device 110. The data packet 600b is routed (720) to data center A 120a by the load balancer 130 while the data packets 600d and 600g are routed (720) to data center B 120b by the load balancer 130. The data packet 600b is routed (732a) to the server system 122a and captured (736a) by the data collection system 124a in data center A 120a. The data packets 600d and 600g are routed (732b) to the server system 122b and captured (736b) by the data collection system 124b in data center B 120b. The data collection systems 124a and 124b send (738a and 738b) the data packets to the reconstruction engine 150. The reconstruction engine 150 reconstructs (750) the data packets received from data centers A 120a and B 120b into the data that the user 112 sent. Thus, the data packets are split among the data centers 120a and 120b for processing (734a and 734b) by the server systems 122a and 122b, but are reconstructed (750) by the reconstruction engine 150.

For example, the reconstruction (750) can include matching origination and destination parameters between the data packets. Using, for example, the exemplary system 100 of FIG. 1 and the parts of the data of FIGS. 6A-6I, the reconstruction engine 150 reconstructs data packets into data. The data packets 600b, 600d, 600e, 600g, and 600h show the information parameters 610b, 610d, 610e, 610g, and 610h. The information parameters 610b, 610d, 610e, 610g, and 610h include the origination parameters (e.g., the source field, the destination field). The source field shows that the data packets as illustrated in FIGS. 6B, 6D, and 6G are originating from address 192.168.0.1. The destination field shows that the data packets 600e and 600h are sent to address 192.168.0.1. The origination field and destination fields are matched between the data packets by the reconstruction engine 150 to form the data. The matching is part or all of the reconstruction (750) of the data.

An advantage of the exemplary system 100 is that the data packets 600b, 600d, and 600g are routed to different data centers 130a and 130b by the load balancer 130 for processing (734a and 734b) by the server systems 122a and 122b and the data packets 600b, 600d, and 600g routed through the different data centers 130a and 130b and the data packets transmitted by the server systems 122a and 122b are reconstructed into the data transmitted from and received by the user's transmitting device 110. The data packet 600b is routed (720) to data center A 120a by the load balancer 130 while the data packets 600d and 600g are routed (720) to data center B 120b by the load balancer 130. The data packet 600b is routed (732a) to the server system 122a and captured (736a) by the data collection system 124a in data center A 120a. The data packets 600d and 600g are routed (732b) to the server system 122b and captured (736b) by the data collection system 124b in data center B 120b. The data collection systems 124a and 124b capture (736a and 736b) the data packets 600e and 600h that are responses to the user 112. The data collection systems 124a and 124b send (738a and 738b) the data packets to the reconstruction engine 150. The reconstruction engine 150 reconstructs (750) the data packets received from data centers A 120a and B 120b into the data that the user 112 sent and received. Thus, the data packets are split among the data centers 120a and 120b for processing (734a and 734b) by the server systems 122a and 122b, but are reconstructed (750) by the reconstruction engine 150.

Figure 8:
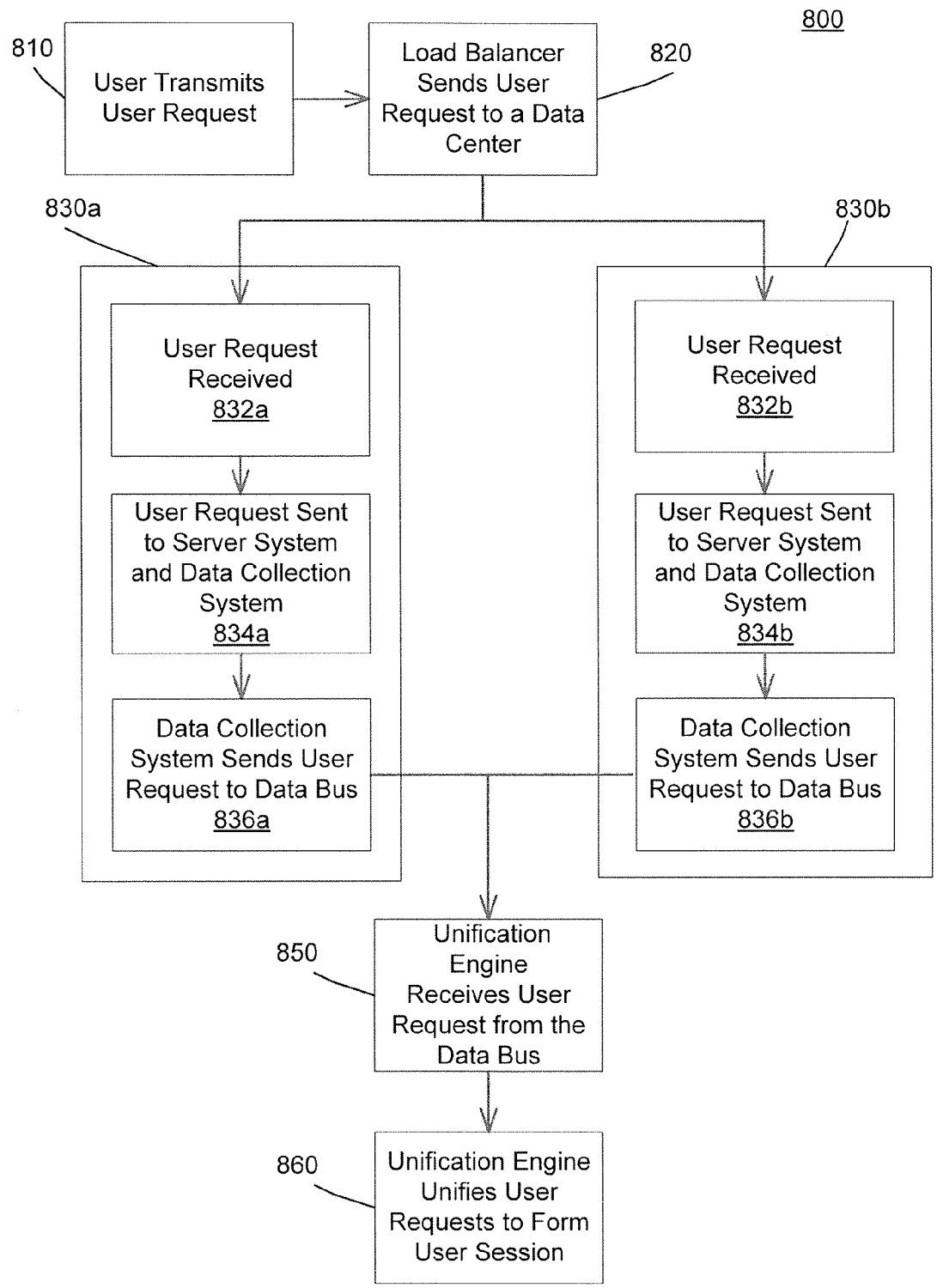
FIG. 8 is a flowchart depicting the transmission of user sessions through an exemplary system.

FIG. 8 is a flowchart 800 illustrating a process of the transmission of user requests through the exemplary system 300 of FIG. 3. The user 112 transmits (810) the user request using the transmitting device 110. The load balancer 130 receives the user request and sends (820) the user request to one of the data centers, 120a or 120b. FIG. 8 includes the processing performed at data center A 120a, illustrated as grouping 830a and the processing performed at data center B 120b, illustrated as grouping 830b. At either data center, the user request is received (832a or 232b) at the data center 120a or 120b. The user request is sent (834a or 834b) to the server system 122a or 122b and to the data collection system 124a or 124b, respectively. The data collection systems sends (836a or 836b) the user request to the data bus 210. The unification engine 320 receives (850) the user request from the data bus 210. The unification engine 320 unifies (860) the user requests received from the data bus 210 to form the user session.

The unification (860) of user requests can occur in several different ways. For example, the unification (860) includes matching origination and destination parameters between the user requests. Using, for example, the exemplary system 300 of FIG. 3 and the parts of the user session of FIGS. 6A-6I, the unification engine 320 unifies (860) user requests into user sessions. The user session includes the user requests 600b, 600d, and 600g, responses 600e and 600h, and the information for the screenshots 600a, 600c, 600f, and 600i. The user requests 600b, 600d, and 600g and responses 600e and 600h show the information parameters 610b, 610d, 610e, 610g, and 610h. The information parameters 610b, 610d, 610e, 610g, and 610h include the origination parameters (e.g., the source field, the destination field). The source field shows that the user requests 600b, 600d, and 600g are originating from address 192.168.0.1. The destination field shows that the user requests 600e and 600h are being sent to address 192.168.0.1. The information data 612b, 612d, 612e, 612g, and 612h provides part or all of the information for the screenshots 600a, 600c, 600f, and 600i that are part or all of the user session. The origination field and destination field can be matched between the user requests by the unification engine 320 to form the data. Based on the information stored in the database 220, the unification engine 320 can match the information that is in the screenshots to the user requests (e.g., the unification engine can match a user request containing login information to the screenshot 600a of FIG. 6 generated by the login module). The matching of the fields and the matching of the information in the screenshots are part or all of the unification (860) of the user session.

An advantage of the exemplary system 300 is that the user requests 600b, 600d, and 600g which are routed to different data centers 130a and 130b by the load balancer 130 are unified with the user requests 600e and 600h being sent to the user 112 and the information contained in the screenshots 600a, 600c, 600f, and 600i.

Figure 9:
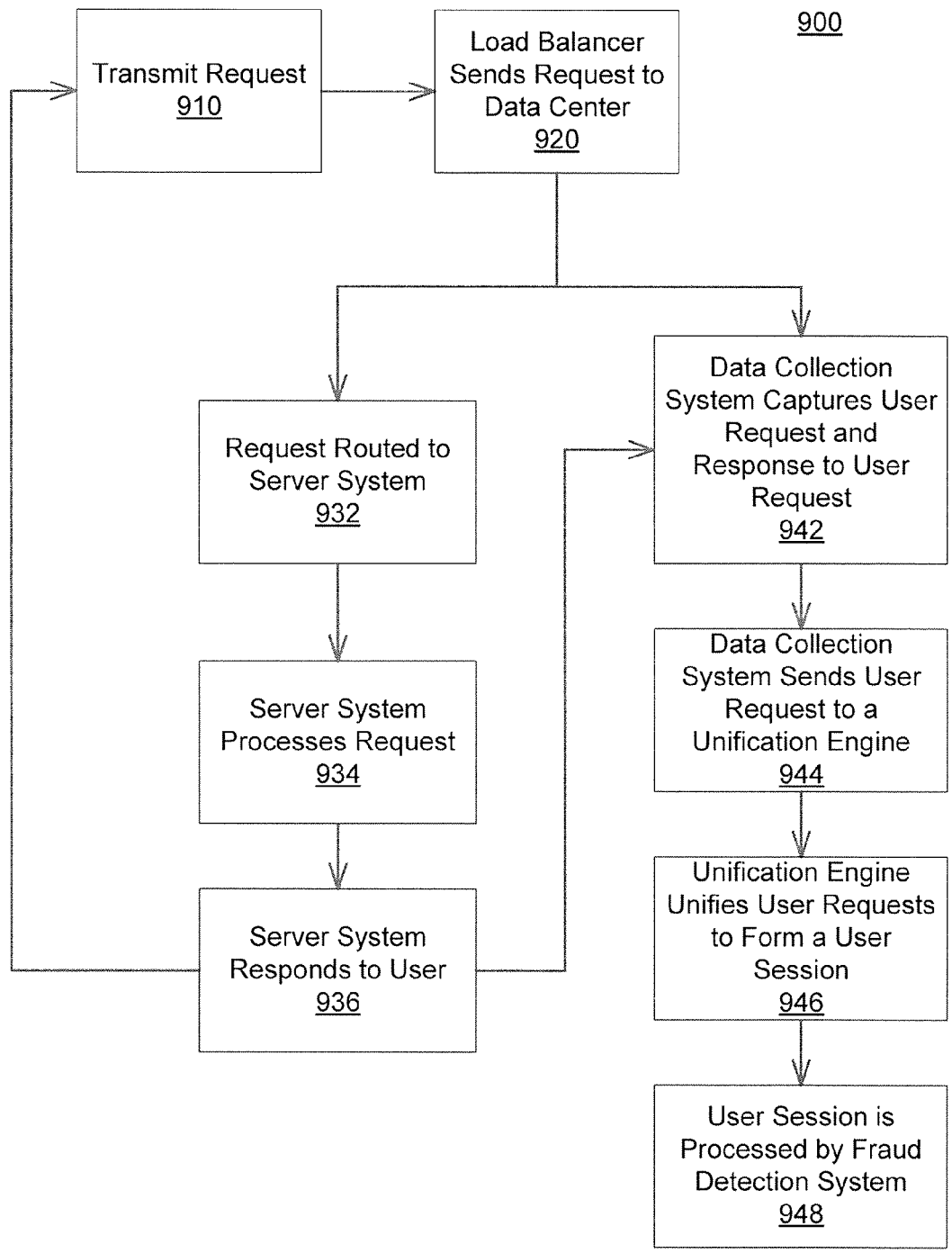
FIG. 9 is a flowchart showing the processing of a user request being transmitted to a data center and through both the server system at the data center and the data collection system.

FIG. 9 is a flowchart 900 illustrating a process of the transmission of user requests through the exemplary system 300 of FIG. 3. The user 112 using a transmitting device 110 transmits (910) the user request. The user request is sent (920) by the load balancer 130 to the data center 120b. Data center B 120b is used in this example, however the load balancer can send (920) the user request to data center A 120a. The request is routed (932) to the server system 122b. The server system 122b processes (934) the request. Server system 122b responds (936) to the user request. The response is routed back to the user 112 through her transmitting device 110 and is captured (942) by the data collection system 124b. The data collection system 124b captures (942) the user request at or near the same time as the user request is routed (932) to the server system 122b. The data collection system 124b captures (942) the user request without affecting the processing (934) of the user request by the server system 122b. After capturing (942) the user request, the data collection system 124b sends (944) the user request to the unification engine 320. The unification engine 320 unifies (946) the user request to form the user session. The unification engine 320 unifies (946) the user request by itself or with other user requests to form the user session. The user session is processed (948) by the fraud detection system 160 to detect fraudulent activity.

Using, for example, the exemplary system 400 of FIG. 4 and the parts of the user session of FIGS. 6A-6I, the fraud detection system 405 processes (948) user sessions to determine if the activity is fraudulent. The fraud detection system 405 uses the geolocation profiling engine 410, the behavior profiling engine 420, and the transactional rules engine 440 to process (948) the user session that includes the buy order in the user request 600g (i.e., 1,000,000 bonds of the fund). The geolocation profiling engine 410 processes (948) the location that the user 112 is transmitting the buy order from. The location is not suspect (e.g., the network address and network subnet are not on a list of suspect networks) based on the network address and network subnet. The geolocation profiling engine 410 generates a report of non-fraudulent activity. The behavior profiling engine 420 analyzes the buy order to determine whether the buy order is outside of the range of the behavior of the user's profile. The behavior profiling engine 420 determines that the buy order is not outside of the range of the behavior of the user 112 because by accessing the stored elements in the database 450, the behavior profiling engine 420 determines that the user 112 has bought and sold millions of shares of bonds over the past ten years. The behavior profiling engine 420 generates a report of non-fraudulent activity. The transactional rules engine 440 analyzes the buy order to determine whether the buy order is outside of the normal range of buy and sell orders for the particular bond. The transactional rules engine 440 determines that the buying and selling of one million bonds is within the normal range for the particular bond (e.g., the bond averages one hundred million buy and sell transactions per week). The transactional rules engine 440 generates a report of non-fraudulent activity. Based on the reports of the geolocation profiling engine 410, the behavior profiling engine 420, and the transactional rules engine 440, the fraud detection system 405 determines that the user session is not fraudulent.

Figure 10:
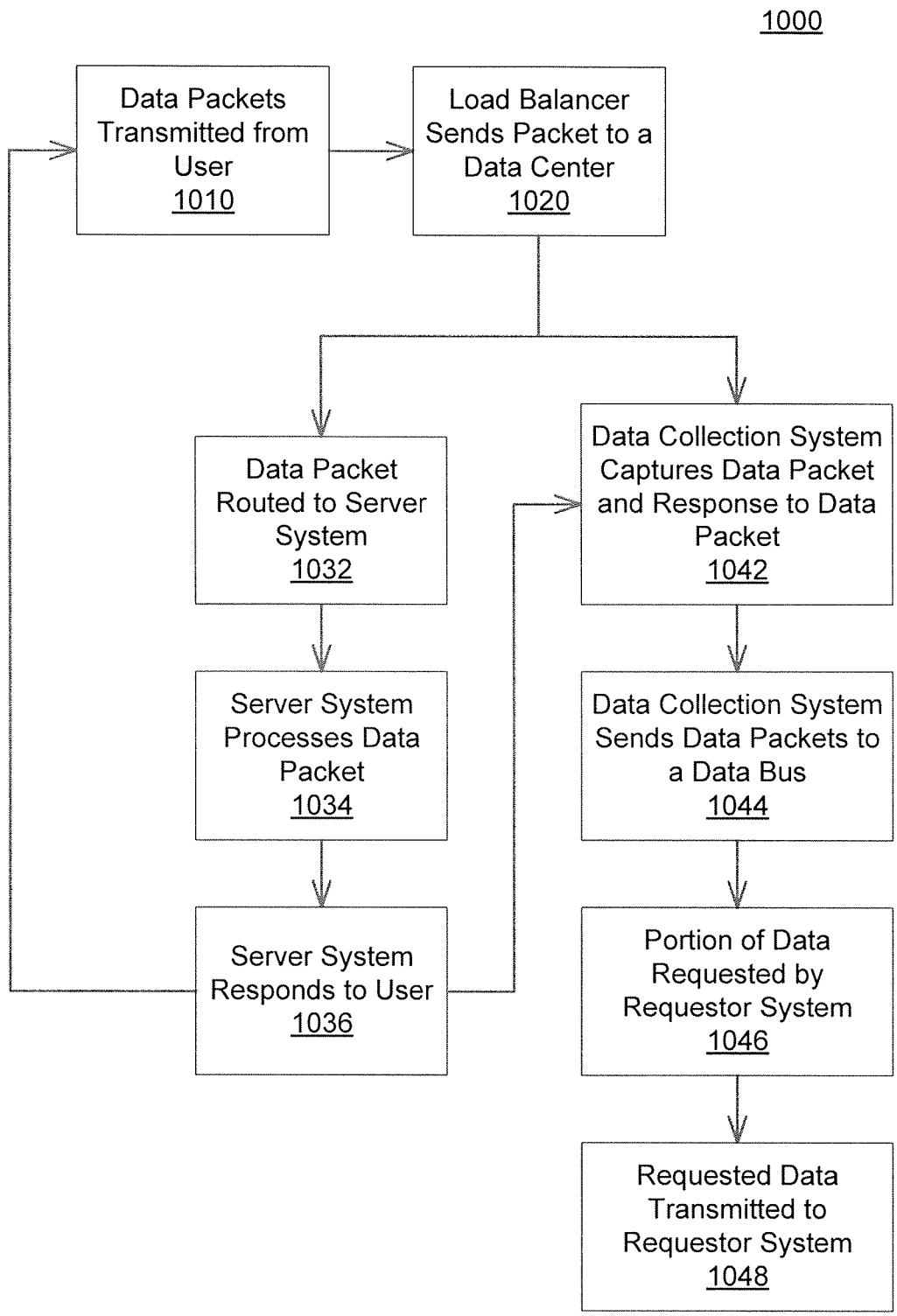
FIG. 10 is a flowchart showing the processing of data packets through the system and transmission of the data packets to requester systems.

FIG. 10 is a flowchart 1000 illustrating a process of the transmission of data packets through the exemplary system 500 of FIG. 5. The user 112 using a transmitting device 110 transmits (1010) the data packet. The data packet is sent (1020) by the load balancer 130 to the data center B 120b. Data center B 120b is used in this example, however the load balancer can send (1020) the user request to data center A 120a. The data packet is routed (1032) to the server system 122b. The server system 122b processes (1034) the data packet. Server system 122b responds (1036) to the data packet. The response is routed back to the user 112 through her transmitting device 110 and is captured (1042) by the data collection system 124b. The data collection system 124b captures (1042) the data packet at or near the same as the data packet is routed (1032) to the server system 122b. The data collection system 124b captures (1042) the data packet without affecting the processing (1034) of the data packet by the server system 122b. After capturing (1042) the data packet, the data collection system 124b sends (1044) the data packet to the data bus 210. The requester system requests (1046) part of the data from the data bus 210. The requested data is transmitted (1048) from the data bus 210 to the requester system.

Using, for example, the exemplary system 500 of FIG. 5 and the parts of the data of FIGS. 6A-6I, the requestor system (e.g., 562, 564, 566, and/or 568) requests (1046) part of the data from the data bus 210. For this example, the requester system is the performance analysis system 568. The performance analysis system 568 analyzes data packets to determine the response time of the search module. The performance analysis system 568 requests (1046) the data that is sent to and from the search module. The data bus 210 transmits (1048) the requested parts of the data to the performance analysis system 568. The parts of the data are the data packets 600d and 600e which represent the parts of the data sent to and from the search module. The performance analysis system 568 analyzes the response time between the data packet requesting the search 600d and the data packet that transmitted the search results 600e. A high response time indicates that the system 500 is loaded and the performance analysis system 568 makes changes to the configuration of the load balancer 130 and/or the server systems 122a and 122b to decrease the response time. A low response time indicates that the system 500 is responding in an appropriate timeframe to the user request and no corrective action is needed. The performance analysis system 568 monitors the modules of the system 500 and makes changes to the system 500 to decrease response times when appropriate.

For this example, the requester system is the customer service system 566. The customer service system 566 is analyzing data packets to diagnose and fix problems that the user 112 is having with the system 500. The user 112 is attempting to search for information utilizing the information data 612d by submitting the information to the search module that is part of the system 500. The search module is not returning the correct information. The user 112 contacts a customer service representative who uses the customer service system 566 to look at the data for the user 112. The portion of the data is requested (1046) by the customer service system 566. The customer service representative identifies that the information parameters 610d are not being transmitted to the system 500 correctly and therefore the information request is failing. The customer service representative instructs the user 112 to update her world wide web browser software (e.g., Mozilla® Firefox) and to try again. The user 112 updates her world wide web browser software and submits the data packet 600d to the system 500. The user 112 receives the data packet response 600e (i.e., response to the user's request) as illustrated by the screenshot 600f.

Figure 11:
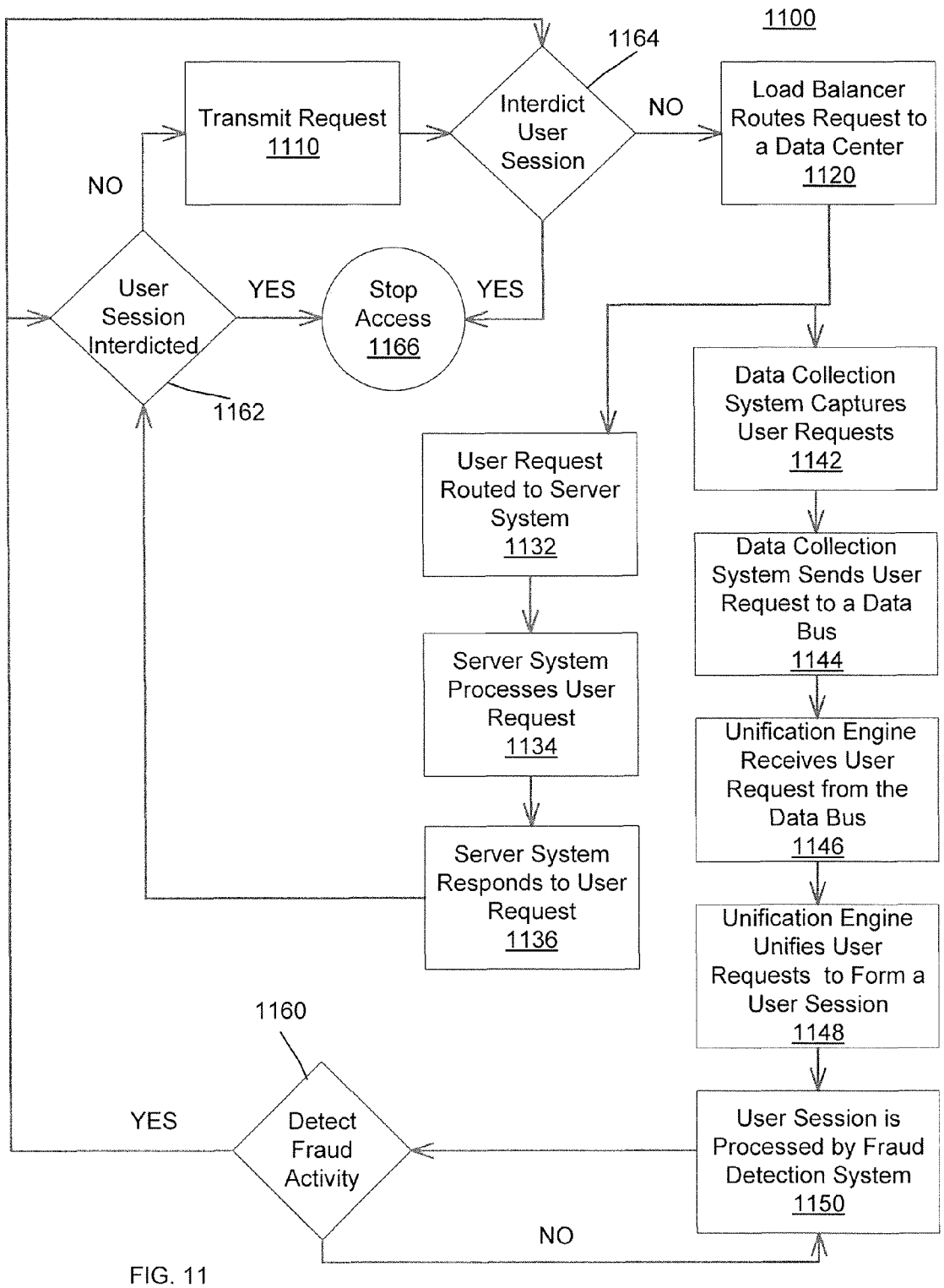
FIG. 11 is a flowchart showing the interdiction of user sessions when fraudulent activity is detected.

FIG. 11 is a flowchart 1100 illustrating a process of the transmission of user requests through the exemplary system 300 of FIG. 3. The user 112 using a transmitting device 110 transmits (1110) the user request. The interdiction system 330 determines (1164) whether the user session should be interdicted based on notifications from the fraud detection system 160. The fraud detection system 160 sends the notification to the interdiction system 330 when, for example, the user 112 is making transactions outside of the user's behavior profile (e.g., the user 112 is buying ten millions shares of stock when the user 112 only has one hundred shares of stock in her portfolio before this transaction).

If the interdiction system 330 does not interdict (1164) the user session, then the user request is routed (1120) by the load balancer 130 to the data center 120b. If the interdiction system 330 does interdict (1164) the user session, then access is the system 1100 is stopped (1166). Data center B 120b is used in this example, however the load balancer can send (920) the user request to data center A 120a. The request is routed (1032) to the server system 122b. The server system 122b processes (1034) the request. Server system 122b responds (1036) to the user request. The response is routed back to the user 112 through her transmitting device 110 unless the interdiction system 330 determines (1162) that the user session should be interdicted based on notifications from the fraud detection system 160. If the interdiction system 330 does interdict (1162) the user session, then access is the system 100 is stopped (1166) (i.e., the response to the user request is not sent back to the user 112).

The data collection system 124b captures (1142) the user request at or near the same as the user request is routed (1132) to the server system 122b. The data collection system 124b captures (1142) the user request without affecting the processing (1134) of the user request by the server system 122b. After capturing (1142) the user request, the data collection system 124b sends (1144) the user request to the data bus 210. The unification engine 320 receives (1146) the user request from the data bus 210. The unification engine 320 unifies (1148) the user request to form the user session. The unification engine 320 unifies (1148) the user request by itself or with other user requests to form the user session. The user session is processed (1050) by the fraud detection system 160 to detect fraudulent activity. If the fraud detection system 160 detects (1160) fraudulent activity, then the fraud detection system 160 notifies the interdiction system 330. If the fraud detection system 160 does not detect (1160) fraudulent activity, then the fraud detection system 160 continues processing (1150) user sessions looking for fraudulent activity.

Using, for example the exemplary system 400 of FIG. 4 and the parts of the user session of FIGS. 6A-6I, the interdiction system 330 determines (1162 and 1164) whether to interdict user requests and responses to user requests. The unification (1148) of user requests into user sessions by the unification engine 320 is described above. The user session is processed (1150) by the fraud detection system 405 to look for search terms that are categorized as suspect. The fraud detection system 405 uses the behavior profiling engine 420 to process (1150) the user session. The behavior profiling engine 420 processes (1150) the search terms in the information data 612d to determine if the search terms are categorized by the behavior profiling engine 420 as suspect. The search terms for a high yield bond, fund performance of ten years or greater, and a Morningstar rating of five stars is not classified as a suspect search term by the behavior profiling engine 420 because the search is categorized as a long term investment search and not a fraudulent search. Therefore, the behavior profiling engine 420 will not classify the search by the user 112 as fraudulent activity and the fraud detection system 160 will not notify (1160) the interdiction system 330 since no fraudulent activity was detected.

Figure 12:
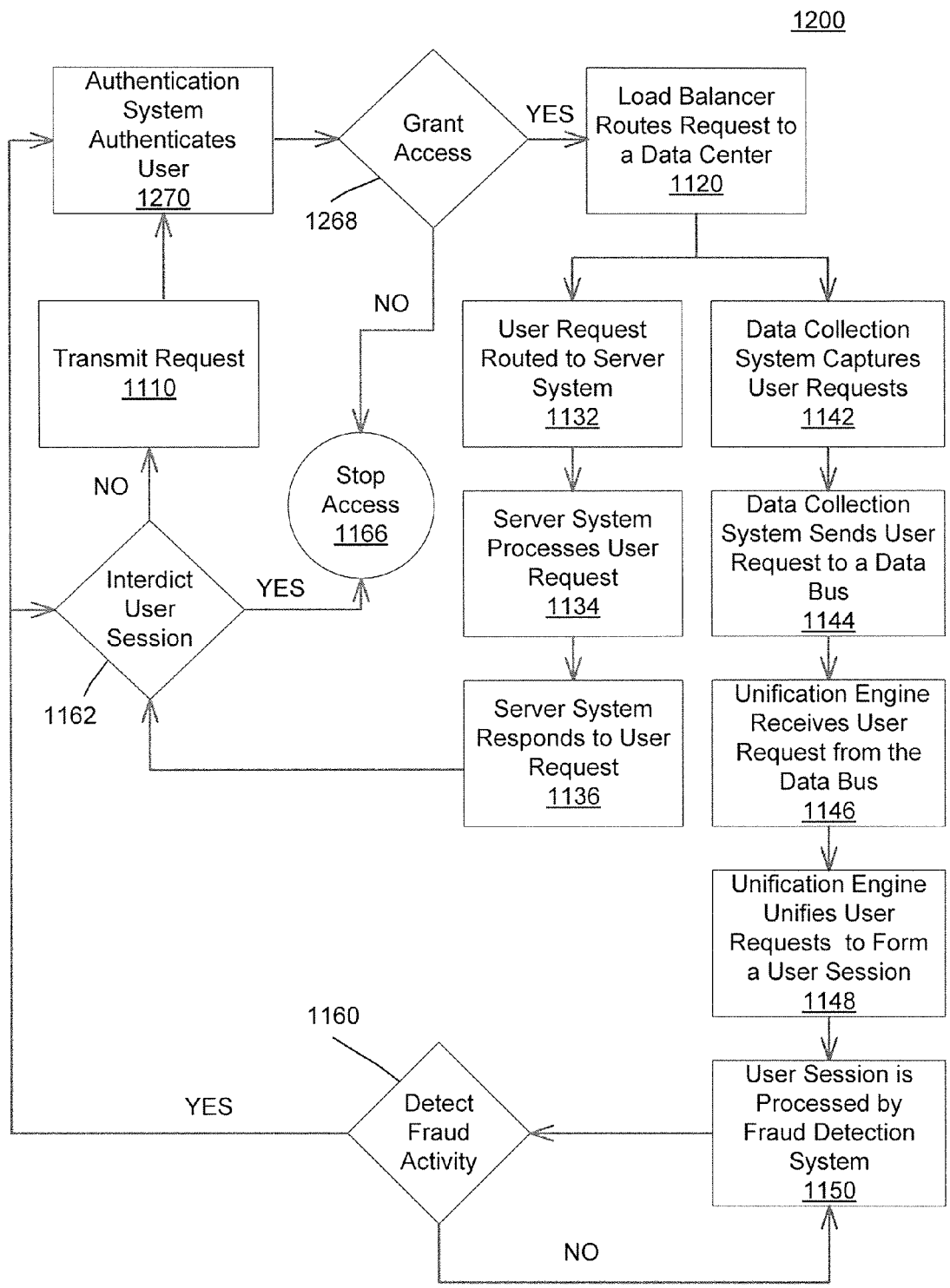
FIG. 12 is a flowchart showing the communication of fraudulent activity to the authentication system.

FIG. 12 is a flowchart 1200 illustrating a process of the transmission of user requests through the exemplary system 400 of FIG. 4. The process of the transmission of user requests is similar in parts to FIG. 11 as described above. The user 112 using a transmitting device 110 transmits (1110) the user request. The user request is sent to the authentication system that authenticates (1270) the user 112 to verify that only user requests from a properly authenticated user 112 are allowed to access the system 1200. If the user 112 is granted (1268) access to the system 1200, then the user request is transmitted to the load balancer 130. If the user 112 is not granted (1268) access to the system 1200, then the user access is stopped (1166).

In some examples, the authentication system includes a computer, a network hub, a network switch, a network router, a network firewall, an authentication server (e.g., Kerberos authentication server in Windows® Server 2003 available from Microsoft Corporation, Oracle® Access Manager available from Oracle Corporation), and/or other authentication modules.

Figure 13:
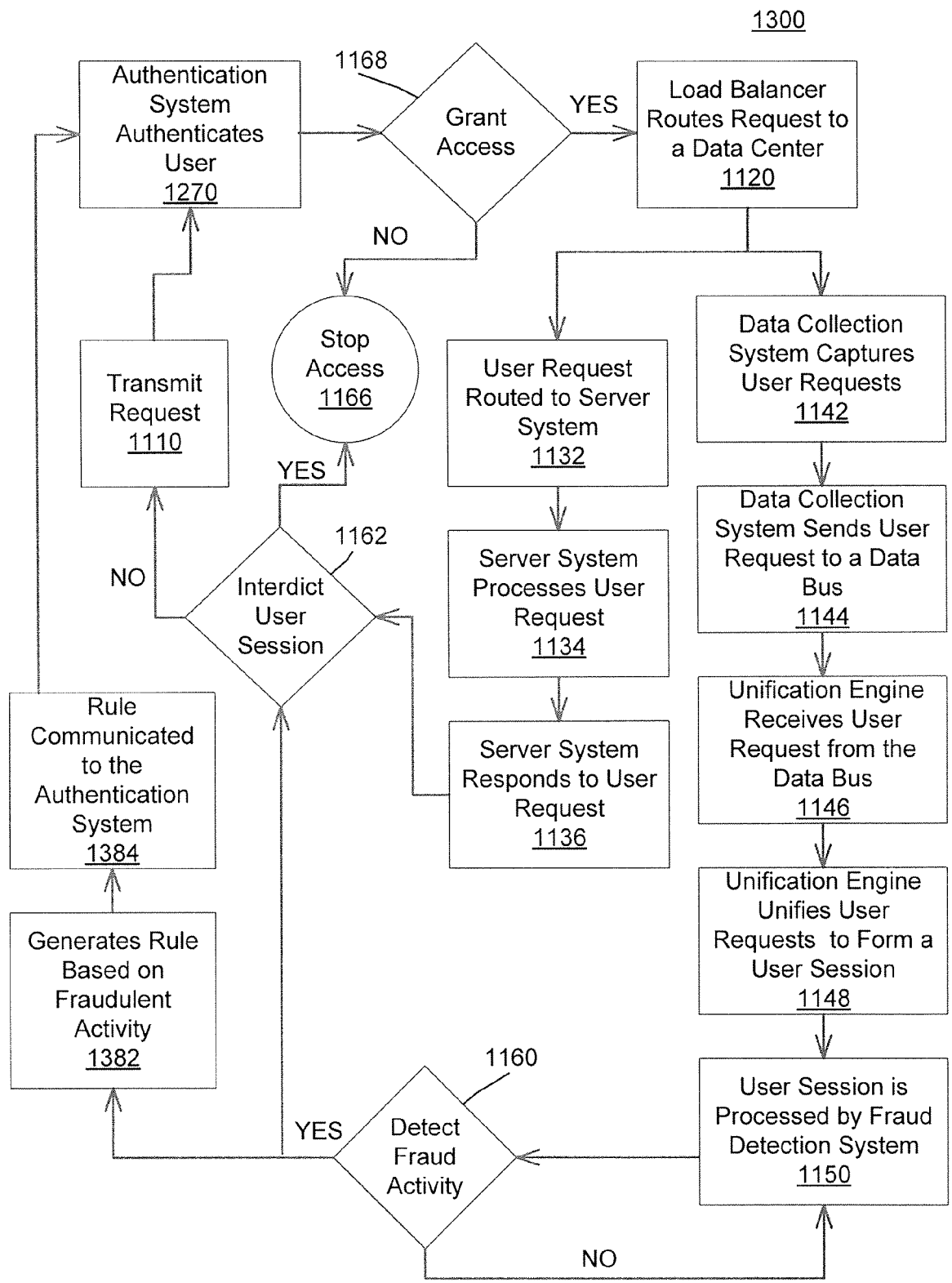
FIG. 13 is a flowchart showing the creation of rules in response to the detection of fraudulent activity.

FIG. 13 is a flowchart 1300 illustrating a process of the transmission of user requests through the exemplary system 400 of FIG. 4. The process of the transmission of user requests is similar in parts to FIGS. 11 and 12 as described above. If the fraud detection system 405 detects (1160) fraudulent activity, then the interdiction system 330 generates (1382) an authentication rule based on the fraudulent activity. The authentication rule is communicated (1384) to the authentication system. When the user 112 transmits (1110) the user request, then the authentication system will have the rule when authenticating (1270) the user 112. In some examples, the rule includes the identification of a certain location that is not allowed access to the exemplary system, the identification of a certain user account that is not allowed access to the exemplary system, and/or the identification of a certain user account that is not allowed access to the exemplary system for a set amount of time.

Figure 14:
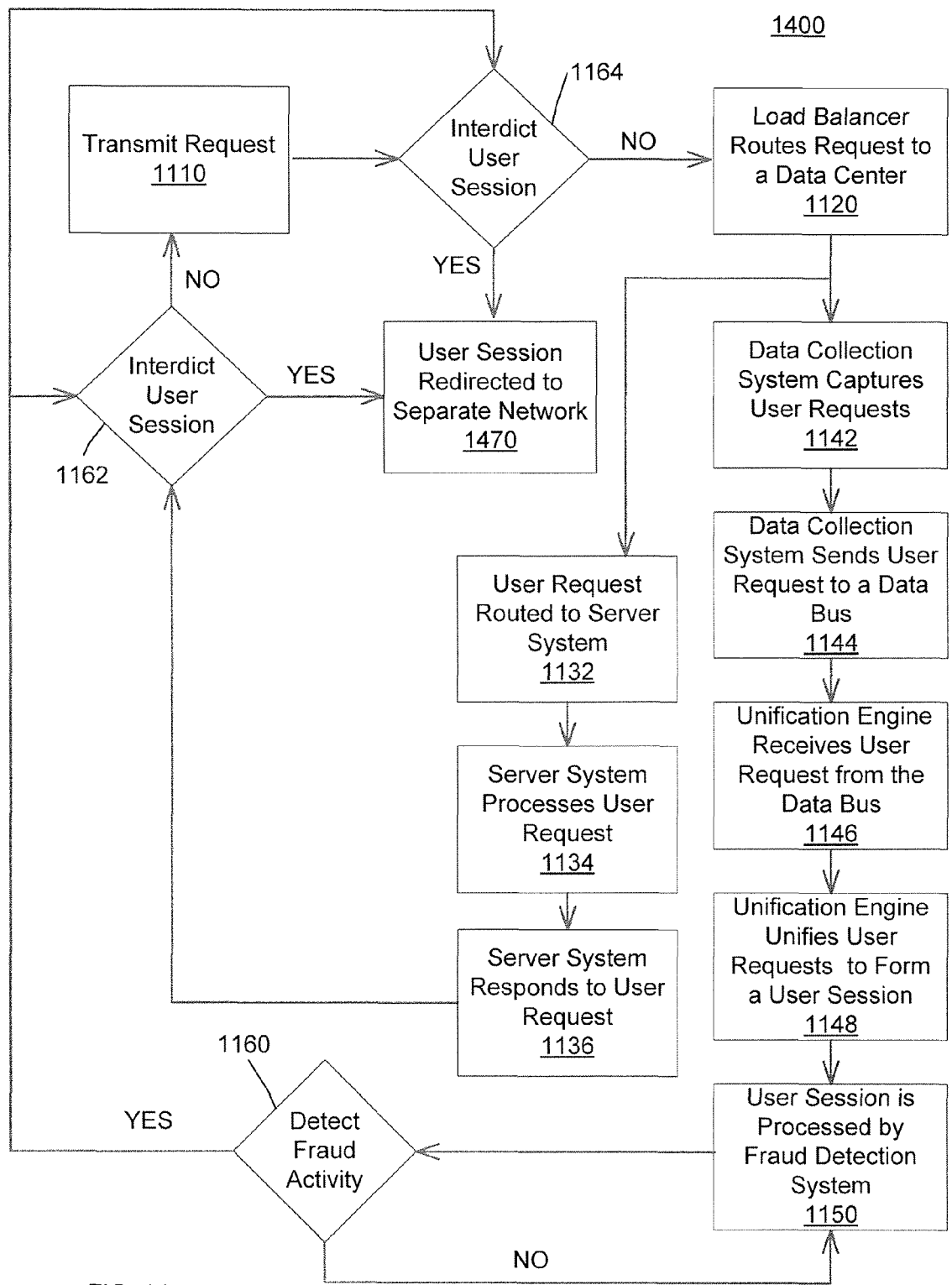
FIG. 14 is a flowchart showing the redirection of a user session to a separate network to mitigate fraudulent activity.

FIG. 14 is a flowchart 1400 illustrating a process of the transmission of user requests through the exemplary system 400 of FIG. 4. The process of the transmission of user requests is similar in parts to FIGS. 11, 12, and 13 as described above. If the fraud detection system 405 detects (1160) fraudulent activity, then the interdiction system 330 interdicts (1162 and 1164) the user requests and the responses to the user requests for the user session in which fraud was detected. The interdiction system 330 then redirects (1470) the user requests and responses to the user requests to a separate network. In some examples, the separate network includes a honeypot server, a honeypot network, a server system, a network firewall, a network router, a network hub, a network switch, and/or other network communication devices. The separate network is, for example, used to allow the user 115 to continue the fraudulent activity without adversely affecting the data centers 120a and 120b. The ability to allow the user 115 to continue committing the fraudulent activity on the separate network allows for the analysis of the fraudulent activity for the addition or modification of rules and/or profiles for the fraud detection system 405.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method of detecting fraudulent activity, the method comprising:
    receiving, by a fraud detection device in a first network, at least a portion of a user session comprising a plurality of interactions between a plurality of data centers and one or more devices, remote from the data centers, of a user, from a data reconstruction device, wherein each interaction of the plurality of interactions includes (i) envelope information and (ii) at least one request for information, a data center request for information, a user response, or a data center response;
    comparing, at the fraud detection device, the at least a portion of the user session to one or more application contexts to determine whether the at least a portion of the user session includes fraudulent activity, wherein each of the one or more application contexts includes a set of fraudulent behavior indicators;
    generating, at the fraud detection device, a session confidence value based on the comparison of the at least a portion of the user session to one or more application contexts; and
    redirecting, by the fraud detection device, subsequent interactions received from the one or more devices to a second network isolated from the plurality of data centers if the activity pattern is found to deviate from the baseline of normal activity; and
    monitoring, by the fraud detection device, the subsequent interactions to determine additional deviations from the baseline of normal activity.

2. The method of claim 1, wherein the fraud detection device includes a geolocational profiling engine.

3. The method of claim 2 wherein the geolocational profiling engine uses global address lookup, network address, network information, routing information, time, date, device cookies, fraudulent activity history, fraud patterns, device fingerprint, or combinations thereof.

4. The method of claim 1, wherein the fraud detection device includes a behavior profiling engine.

5. The method of claim 4 wherein the behavior profiling engine uses global address lookup, network address, network information, routing information, time, date, device cookies, fraudulent activity history, user behavior history, user preferences, user account information, fraud patterns, device fingerprint, or combinations thereof.

6. The method of claim 1, wherein the fraud detection device includes an application rules engine.

7. The method of claim 6 wherein the application rules engine uses global address lookup, network address, network information, routing information, time, date, device cookies, fraudulent activity history, user behavior history, user preferences, user account information, user profile changes, account activity, or combinations thereof.

8. The method of claim 1, wherein the fraud detection device includes a transactional rules engine.

9. The method of claim 8 wherein the transactional rules engine uses global address lookup, network address, network information, routing information, time, date, device cookies, fraudulent activity history, user behavior history, user preferences, user account information, user profile changes, account activity, transaction history, transaction, or combinations thereof.

10. The method of claim 1, wherein the set of fraudulent behavior indicators includes geolocational profiling indicators.

11. The method of claim 1, wherein the set of fraudulent behavior indicators includes behavioral profiling indicators.

12. The method of claim 1, wherein the set of fraudulent behavior indicators includes application rules indicators.

13. The method of claim 1, wherein the set of fraudulent behavior indicators includes transactional rules indicators.

14. The method of claim 1, wherein the one or more application contexts include a human resources context, a financial services context, a customer service context, a consumer transaction context, or any combination thereof.

15. The method of claim 1, wherein the at least a portion of a user session includes live user session data, historical user session data, or both.

16. The method of claim 1, wherein the at least a portion of a user session includes data associated with a plurality of users.

17. A system for detecting fraudulent activity, the system comprising:
    a fraud detection device in a first network configured to:
        receive at least a portion of a user session comprising a plurality of interactions between a plurality of data centers and one or more devices, remote from the data centers, of a user, from a data reconstruction device, wherein each interaction of the plurality of interactions includes (i) envelope information and (ii) a user request for information, a data center request for information, a user response, or a data center response;
        compare the at least a portion of the user session to one or more application contexts to determine whether the at least a portion of the user session includes fraudulent activity, wherein each of the one or more application contexts includes a set of fraudulent behavior indicators;
        generate a session confidence value based on the comparison of the at least a portion of the user session to one or more application contexts; and
        redirect subsequent interactions received from the one or more devices to a second network isolated from the plurality of data centers if the activity pattern is found to deviate from the baseline of normal activity; and monitor the subsequent interactions to determine additional deviations from the baseline of normal activity.

18. A system for detecting fraudulent activity, the system comprising:

means for receiving, at a fraud detection device in a first network, at least a portion of a user session comprising a plurality of interactions between a plurality of data centers and one or more devices, remote from the data centers, of a user, from a data reconstruction device, wherein each interaction of the plurality of interactions includes (i) envelope information and (ii) a user request for information, a data center request for information, a user response, or a data center response;

means for comparing, at the fraud detection device, compare the at least a portion of the user session to one or more application contexts to determine whether the at least a portion of the user session includes fraudulent activity, wherein each of the one or more application contexts includes a set of fraudulent behavior indicators;

means for generating, at the fraud detection device, a session confidence value based on the comparison of the at least a portion of the user session to one or more application contexts; and means for redirecting, by the fraud detection device, subsequent interactions received from the one or more devices to a second network isolated from the plurality of data centers if the session confidence value falls below a predetermined threshold;

means for monitoring, by the fraud detection device, the subsequent interactions to determine additional deviations from the baseline of normal activity.

19. A computer program product, tangibly embodied in a computer readable storage medium, for detecting fraudulent activity, the computer program product including instructions operable to cause a data processing apparatus in a first network to:

receive at least a portion of a user session comprising a plurality of interactions between a plurality of data centers and one or more devices, remote from the data centers, of a user, from a data reconstruction device, wherein each interaction of the plurality of interactions includes (i) envelope information and (ii) a user request for information, a data center request for information, a user response, or a data center response;

compare the at least a portion of the user session to one or more application contexts to determine whether the at least a portion of the user session includes fraudulent activity, wherein each of the one or more application contexts includes a set of fraudulent behavior indicators;

generate a session confidence value based on the comparison of the at least a portion of the user session to one or more application contexts; and redirect subsequent interactions received from the one or more devices to a second network isolated from the plurality of data centers if the activity pattern is found to deviate from the baseline of normal activity; and monitor the subsequent interactions to determine additional deviations from the baseline of normal activity.

* * * * *